United States Patent
Syu

(10) Patent No.: US 12,461,341 B2
(45) Date of Patent: Nov. 4, 2025

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: Rong-Shun Syu, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 602 days.

(21) Appl. No.: 17/880,795

(22) Filed: Aug. 4, 2022

(65) Prior Publication Data
US 2023/0079872 A1    Mar. 16, 2023

(30) Foreign Application Priority Data
Aug. 30, 2021    (TW) .................... 110132084

(51) Int. Cl.
*G02B 9/64* (2006.01)
(52) U.S. Cl.
CPC ...................... *G02B 9/64* (2013.01)
(58) Field of Classification Search
None
See application file for complete search history.

(56) References Cited

U.S. PATENT DOCUMENTS

| | | | |
|---|---|---|---|
| 2020/0371316 A1* | 11/2020 | Wang | G02B 9/64 |
| 2022/0026672 A1* | 1/2022 | Chen | G02B 13/06 |
| 2022/0026673 A1* | 1/2022 | Sun | G02B 13/0045 |
| 2022/0113514 A1* | 4/2022 | Shi | G02B 13/04 |

FOREIGN PATENT DOCUMENTS

| | | |
|---|---|---|
| CN | 110441889 A | 11/2019 |
| CN | 111239984 A | 6/2020 |
| EP | 2149808 A2 | 2/2010 |
| TW | 202011073 A | 3/2020 |

* cited by examiner

*Primary Examiner* — Darryl J Collins
(74) *Attorney, Agent, or Firm* — McClure, Qualey & Rodack, LLP

(57) ABSTRACT

A wide-angle lens assembly includes a first lens, a second lens, a third lens, a fourth lens, a fifth lens, a sixth lens, a seventh lens, and an eighth lens. The first lens is with negative refractive power and includes a concave surface facing an object side. The second lens is with refractive power. The third lens is with refractive power. The fourth lens is with refractive power. The fifth lens is with negative refractive power. The sixth lens is with positive refractive power and includes a convex surface facing an image side. The seventh lens is with positive refractive power. The eighth lens is with negative refractive power and includes a concave surface facing the object side. The first, second, third, fourth, fifth, sixth, seventh, and eighth lenses are arranged in order from the object side to the image side along an optical axis.

15 Claims, 16 Drawing Sheets

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward large field of view. Additionally, the wide-angle lens assembly is developed to have miniaturization, high resolution, and resistance to environment temperature change capabilities in accordance with different application requirements. However, the known wide-angle lens assembly can't satisfy such requirements. Therefore, the wide-angle lens assembly needs a new structure in order to meet the requirements of large field of view, miniaturization, high resolution, and resistance to environment temperature change at the same time.

BRIEF SUMMARY OF THE INVENTION

The invention provides a wide-angle lens assembly to solve the above problems. The wide-angle lens assembly of the invention is provided with characteristics of an increased field of view, a shortened total lens length, an increased resolution, a resisted environment temperature change, and still has a good optical performance.

The wide-angle lens assembly in accordance with an exemplary embodiment of the invention includes a first lens, a second lens, a third lens, a fourth lens, a fifth lens, a sixth lens, a seventh lens, and an eighth lens. The first lens is with negative refractive power and includes a concave surface facing an object side. The second lens is with refractive power. The third lens is with refractive power. The fourth lens is with refractive power. The fifth lens is with negative refractive power. The sixth lens is with positive refractive power and includes a convex surface facing an image side. The seventh lens is with positive refractive power. The eighth lens is with negative refractive power and includes a concave surface facing the object side. The first lens, the second lens, the third lens, the fourth lens, the fifth lens, the sixth lens, the seventh lens, and the eighth lens are arranged in order from the object side to the image side along an optical axis.

In another exemplary embodiment, the second lens is with positive refractive power and includes a convex surface facing the object side.

In yet another exemplary embodiment, the second lens further includes a concave surface facing the image side.

In another exemplary embodiment, the wide-angle lens assembly further includes a stop disposed between the second lens and the third lens, wherein the wide-angle lens assembly satisfies at least one of the following conditions: $-4.8$ mm$<$(Ra+Rc)/Vdb$<$2.1 mm; $-4<$Rb/Rc$<$170; $-75.22$ mm$<$Rd+Rc$<-30.41$ mm; $-37$ mm$<$fb+Rc$<$7 mm; $-20<$Ra/fc$<$37; $5.2<$TTL/BFL$<$5.8; $-1.3<$f1/f$<-1.1$; $2.9<$Vd4/Vd5$<$3.7; wherein TTL is an interval from an object side surface of the first lens to an image plane along the optical axis; BFL is an interval from an image side surface of the eighth lens to the image plane along the optical axis; f1 is an effective focal length of the first lens; f is an effective focal length of the wide-angle lens assembly; Vd4 is an Abbe number of the fourth lens; Vd5 is an Abbe number of the fifth lens; Ra is a radius of curvature of an image side surface of a lens, and the lens is closest to the stop among all the lenses disposed between the object side and the stop; Rc is a radius of curvature of an object side surface of a lens, fc is an effective focal length of the lens, and the lens is closest to the image plane among all the lenses disposed between the stop and the image side; Vdb is an Abbe number of a lens, Rb is a radius of curvature of an object side surface of the lens, fb is an effective focal length of the lens, and the lens is second closest to the stop among all the lenses disposed between the stop and the image side; and Rd is a radius of curvature of an image side surface of a lens, and the lens is third closest to the image plane among all the lenses disposed between the stop and the image side.

In yet another exemplary embodiment, the second lens further includes a convex surface facing the object side.

In another exemplary embodiment, the fourth lens is with positive refractive power and includes a convex surface facing the image side.

In yet another exemplary embodiment, the fourth lens further includes a concave surface facing the object side.

In another exemplary embodiment, the fourth lens further includes a convex surface facing the object side.

In yet another exemplary embodiment, the first lens is a biconcave lens and further includes another concave surface facing the image side, and the third lens is a biconvex lens with positive refractive power and includes a convex surface facing the object side and another convex surface facing the image side.

In another exemplary embodiment, the fifth lens is a biconcave lens and includes a concave surface facing the object side and another concave surface facing the image side and the sixth lens is a biconvex lens and further includes another convex surface facing the object side.

In yet another exemplary embodiment, the seventh lens is a biconvex lens and includes a convex surface facing the object side and another convex surface facing the image side and the eighth lens is a biconcave lens and further includes another concave surface facing the image side.

In another exemplary embodiment, the third, fourth, fifth, sixth, seventh, and eighth lenses include two surfaces, respectively, at least one of the surfaces is an aspheric surface.

In yet another exemplary embodiment, the wide-angle lens assembly further includes a stop disposed between the second lens and the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
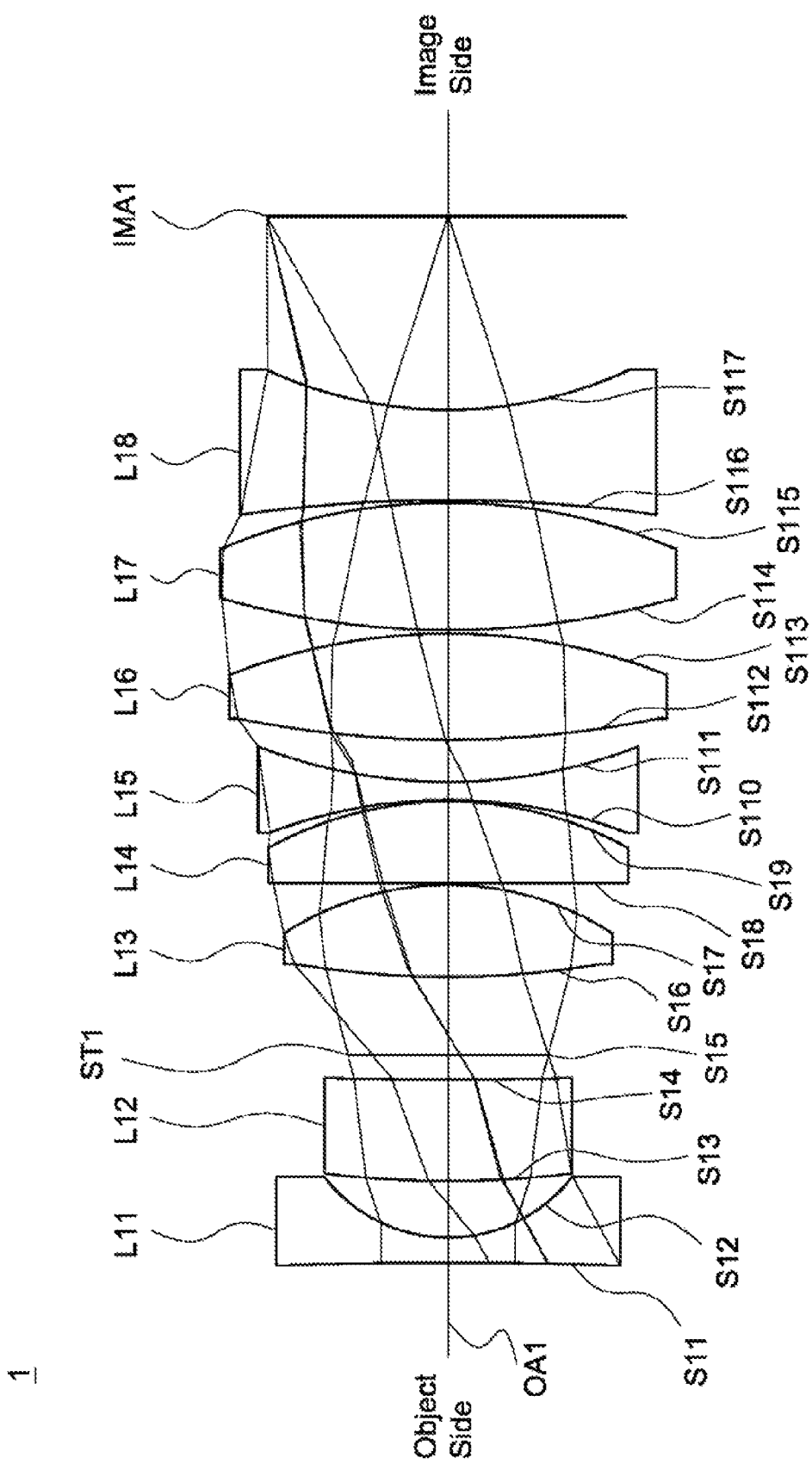
FIG. 1, FIG. 3, FIG. 5, and FIG. 7 are lens layout and optical path diagrams of a wide-angle lens assembly in accordance with a first, a second, a third, and a fourth embodiments of the invention, respectively.

The following description is made for the purpose of illustrating the general principles of the invention and should not be taken in a limiting sense. The scope of the invention is best determined by reference to the appended claims.

The present invention provides a wide-angle lens assembly including a first lens, a second lens, a third lens, a fourth lens, a fifth lens, a sixth lens, a seventh lens, and an eighth lens. The first lens is with negative refractive power and includes a concave surface facing an object side. The second lens is with refractive power. The third lens is with refractive power. The fourth lens is with refractive power. The fifth lens is with negative refractive power. The sixth lens is with positive refractive power and includes a convex surface facing an image side. The seventh lens is with positive refractive power. The eighth lens is with negative refractive power and includes a concave surface facing the object side. The first lens, the second lens, the third lens, the fourth lens, the fifth lens, the sixth lens, the seventh lens, and the eighth lens are arranged in order from the object side to the image side along an optical axis.

Referring to Table 1, Table 2, Table 4, Table 5, Table 7, Table 8, Table 10, Table 11, Table 13, Table 14, Table 16, and Table 17, wherein Table 1, Table 4, Table 7, Table 10, Table 13, and Table 16 show optical specification in accordance with a first, second, third, fourth, fifth, and sixth embodiments of the invention, respectively and Table 2, Table 5, Table 8, Table 11, Table 14, and Table 17 show aspheric coefficients of each aspheric lens in Table 1, Table 4, Table 7, Table 10, Table 13, and Table 16, respectively. The aspheric surface sag z of each aspheric lens in the following embodiments can be calculated by the following formula: $z=ch^2/\{1+[1-(k+1)c^2h^2]^{1/2}\}+Ah^4+Bh^6+Ch^8+Dh^{10}$; where c is curvature, h is the vertical distance from the lens surface to the optical axis, k is conic constant, A, B, C, and D are aspheric coefficients, and the value of the aspheric coefficient A, B, C, and D are presented in scientific notation, such as 1.50E-03 for $1.50\times10^{-3}$.

FIG. 1, FIG. 3, FIG. 5, and FIG. 7 are lens layout and optical path diagrams of the wide-angle lens assemblies in accordance with the first, second, third, and fourth embodiments of the invention, respectively. The lens layout and optical path diagrams of a fifth and a sixth embodiments approximate to that of the fourth embodiment, so that the illustration is omitted. However, the content of the fifth and sixth embodiments below, the element symbols are still being used for convenience of description.

The first lenses L11, L21, L31, L41, L51, L61 are biconcave lenses with negative refractive power and made of glass material, wherein the object side surfaces S11, S21, S31, S41, S51, S61 are concave surfaces, the image side surfaces S12, S22, S32, S42, S52, S62 are concave surfaces, and both of the object side surfaces S11, S21, S31, S41, S51, S61 and image side surfaces S12, S22, S32, S42, S52, S62 are spherical surfaces.

The second lenses L12, L22, L32, L42, L52, L62 are with positive refractive power and made of glass material, wherein the object side surfaces S13, S23, S33, S43, S53, S63 are convex surfaces and both of the object side surfaces S13, S23, S33, S43, S53, S63 and image side surfaces S14, S24, S34, S44, S54, S64 are spherical surfaces.

The third lenses L13, L23, L33, L43, L53, L63 are biconvex lenses with positive refractive power and made of glass material, wherein the object side surfaces S16, S26, S36, S46, S56, S66 are convex surfaces, the image side surfaces S17, S27, S37, S47, S57, S67 are convex surfaces, and both of the object side surfaces S16, S26, S36, S46, S56, S66 and image side surfaces S17, S27, S37, S47, S57, S67 are aspheric surfaces.

The fourth lenses L14, L24, L34, L44, L54, L64 are with positive refractive power and made of glass material, wherein the image side surfaces S19, S29, S39, S49, S59, S69 are convex surfaces and both of the object side surfaces S18, S28, S38, S48, S58, S68 and image side surfaces S19, S29, S39, S49, S59, S69 are spherical surfaces.

The fifth lenses L15, L25, L35, L45, L55, L65 are biconcave lenses with negative refractive power and made of glass material, wherein the object side surfaces S110, S210, S310, S410, S510, S610 are concave surfaces and the image side surfaces S111, S211, S311, S411, S511, S611 are concave surfaces.

The sixth lenses L16, L26, L36, L46, L56, L66 are biconvex lenses with positive refractive power and made of glass material, wherein the object side surfaces S112, S212, S312, S412, S512, S612 are convex surfaces and the image side surfaces S113, S213, S313, S413, S513, S613 are convex surfaces.

The seventh lenses L17, L27, L37, L47, L57, L67 are biconvex lenses with positive refractive power and made of glass material, wherein the object side surfaces S114, S214, S314, S414, S514, S614 are convex surfaces, the image side surfaces S115, S215, S315, S415, S515, S615 are convex surfaces, and both of the object side surfaces S114, S214, S314, S414, S514, S614 and image side surfaces S115, S215, S315, S415, S515, S615 are spherical surfaces.

The eighth lenses L18, L28, L38, L48, L58, L68 are biconcave lenses with negative refractive power and made of glass material, wherein the object side surfaces S116, S216, S316, S416, S516, S616 are concave surfaces, the image side surfaces S117, S217, S317, S417, S517, S617 are concave surfaces, and both of the object side surfaces S116, S216, S316, S416, S516, S616 and image side surfaces S117, S217, S317, S417, S517, S617 are spherical surfaces.

In the wide-angle lens assemblies of the present invention, each two adjacent lenses from the first lens to the eighth lens includes an air gap along the optical axis, that is, the first lens, the second lens, the third lens, the fourth lens, the fifth lens, the sixth lens, the seventh lens, and the eighth lens can be eight single non-cemented lenses. The manufacturing process of the cemented lens is more complicated than that of the non-cemented lens, especially the cemented surfaces of two lenses need to have a high-precision curved surface, so as to achieve a high degree of closeness when two lenses are cemented, and during the cementing process, it may have poor fit due to misalignment that affects the overall image quality. Therefore, any two adjacent lenses can have an air gap along the optical axis so as to ensure the ease of assembly and high yield rate for the wide-angle lens assembly of the present invention.

In addition, the lens assemblies 1, 2, 3, 4, 5, and 6 satisfy at least one of the following conditions:

$-4.8 \text{ mm} < (Ra+Rc)/Vdb < 2.1 \text{ mm}$; (1)

$-37 \text{ mm} < fb+Rc < 7 \text{ mm}$; (2)

$-20 < Ra/fc < 37$; (3)

$-4 < Rb/Rc < 170$; (4)

$5.2 < TTL/BFL < 5.8$; (5)

$-1.3 < f1/f < -1.1$; (6)

$2.9 < Vd4/Vd5 < 3.7$; (7)

$-75.22 \text{ mm} < Rd+Rc < -30.41 \text{ mm}$; (8)

Wherein: Ra is a radius of curvature of the image side surfaces S14, S24, S34, S44, S54, S64 of the lenses L12, L22, L32, L42, L52, L62, wherein the lenses L12, L22, L32, L42, L52, L62 are closest to the stops ST1, ST2, ST3, ST4, ST5, ST6 among all the lenses disposed between the object side and the stops ST1, ST2, ST3, ST4, ST5, ST6 for the first to sixth embodiments; Rc is a radius of curvature of the object side surfaces S116, S216, S316, S416, S516, S616 of the lenses L18, L28, L38, L48, L58, L68, wherein the lenses L18, L28, L38, L48, L58, L68 are closest to the image planes IMA1, IMA2, IMA3, IMA4, IMA5, IMA6 among all the lenses disposed between the stops ST1, ST2, ST3, ST4, ST5, ST6 and the image side for the first to sixth embodiments; Vdb is an Abbe number of the lenses L14, L24, L34, L44, L54, L64, wherein the lenses L14, L24, L34, L44, L54, L64 are second closest to the stops ST1, ST2, ST3, ST4, ST5, ST6 among all the lenses disposed between the stops ST1, ST2, ST3, ST4, ST5, ST6 and the image side for the first to sixth embodiments; Rb is a radius of curvature of the object side surfaces S18, S28, S38, S48, S58, S68 of the lenses L14, L24, L34, L44, L54, L64, wherein the lenses L14, L24, L34, L44, L54, L64 are second closest to the stops ST1, ST2, ST3, ST4, ST5, ST6 among all the lenses disposed between the stops ST1, ST2, ST3, ST4, ST5, ST6 and the image side for the first to sixth embodiments; fb is an effective focal length of the lenses L14, L24, L34, L44, L54, L64, wherein the lenses L14, L24, L34, L44, L54, L64 are second closest to the stops ST1, ST2, ST3, ST4, ST5, ST6 among all the lenses disposed between the stops ST1, ST2, ST3, ST4, ST5, ST6 and the image side for the first to sixth embodiments; fc is an effective focal length of the lenses L18, L28, L38, L48, L58, L68, wherein the lenses L18, L28, L38, L48, L58, L68 are closest to the image planes IMA1, IMA2, IMA3, IMA4, IMA5, IMA6 among all the lenses disposed between the stops ST1, ST2, ST3, ST4, ST5, ST6 and the image side for the first to sixth embodiments; TTL is an interval from the object side surfaces S11, S21, S31, S41, S51, S61 of the first lenses L11, L21, L31, L41, L51, L61 to the image plane IMA1, IMA2, IMA3, IMA4, IMA5, IMA6 along the optical axes OA1, OA2, OA3, OA4, OA5, OA6 for the first to sixth embodiments; BFL is an interval from the image side surfaces S117, S217, S317, S417, S517, S617 of the eighth lenses L18, L28, L38, L48, L58, L68 to the image plane IMA1, IMA2, IMA3, IMA4, IMA5, IMA6 along the optical axes OA1, OA2, OA3, OA4, OA5, OA6 for the first to sixth embodiments; f1 is an effective focal length of the first lenses L11, L21, L31, L41, L51, L61 for the first to sixth embodiments; f is an effective focal length of the wide-angle lens assemblies 1, 2, 3, 4, 5, 6 for the first to sixth embodiments; Vd4 is an Abbe number of the fourth lens L14, L24, L34, L44, L54, L64 for the first to sixth embodiments; Vd5 is an Abbe number of the fifth lens L15, L25, L35, L45, L55, L65 for the first to sixth embodiments; and Rd is a radius of curvature of the image side surfaces S113, S213, S313, S413, S513, S613 of the lenses L16, L26, L36, L46, L56, L66, wherein the lenses L16, L26, L36, L46, L56, L66 are third closest to the image planes IMA1, IMA2, IMA3, IMA4, IMA5, IMA6 among all the lenses disposed between the stops ST1, ST2, ST3, ST4, ST5, ST6 and the image side for the first to sixth embodiments. With the lens assemblies 1, 2, 3, 4, 5, 6 satisfying at least one of the above conditions (1)-(8), the total lens length can be effectively shortened, the volume of the wide-angle lens assembly can be effectively decreased, the field of view can be effectively increased, the resolution can be effectively increased, the environment temperature change can be effectively resisted, and the aberration can be effectively corrected.

When the condition (1): $-4.8 \text{ mm} < (Ra+Rc)/Vdb < 2.1 \text{ mm}$ is satisfied, the field curvature can be effectively corrected, the volume of the wide-angle lens assembly can be effectively decreased, and the sensitivity of the system can be effectively reduced.

When the condition (2): $-37 \text{ mm} < fb+Rc < 7 \text{ mm}$ is satisfied, the astigmatism can be effectively corrected and the performance degradation caused by high temperature environment can be effectively compensated.

When the condition (3): $-20 < Ra/fc < 37$ is satisfied, the incident angle of the light for the photosensitive element can be increased effectively thereby reducing the total lens length and increasing the peripheral brightness.

When the condition (4): $-4 < Rb/Rc < 170$ is satisfied, the off-axis aberration and astigmatism can be effectively corrected.

When the condition (5): $5.2 < TTL/BFL < 5.8$ is satisfied, the back focal length can be effectively guaranteed to facilitate the assembly of the wide-angle lens assembly.

When the condition (6): $-1.3 < f1/f < -1.1$ is satisfied, the refractive power of the first lens can be effectively increased.

When the condition (7): $2.9 < Vd4/Vd5 < 3.7$ is satisfied, the chromatic aberration can be effectively decreased and the resolution can be effectively increased.

When the condition (8): $-75.22 \text{ mm} < Rd+Rc < -30.41 \text{ mm}$ is satisfied, the field curvature can be effectively corrected and the chief ray angle of the image plane can be effectively increased.

When the condition (5): $5.2 < TTL/BFL < 5.8$, condition (6): $-1.3 < f1/f < -1.1$, and condition (8): $-75.22 \text{ mm} < Rd+Rc < -30.41 \text{ mm}$ is satisfied, the effective focal lens and curvature can be effectively adjusted thereby concentrating the field curvature.

A detailed description of a wide-angle lens assembly in accordance with a first embodiment of the invention is as follows. Referring to FIG. 1, the wide-angle lens assembly 1 includes a first lens L11, a second lens L12, a stop ST1, a third lens L13, a fourth lens L14, a fifth lens L15, a sixth lens L16, a seventh lens L17, and an eighth lens L18, all of which are arranged in order from an object side to an image side along an optical axis OA1. In operation, the light from the object side is imaged on an image plane IMA1.

According to the foregoing, wherein: the second lens L12 is a meniscus lens, wherein the image side surface S14 is a concave surface; the fourth lens L14 is a meniscus lens, wherein the object side surface S18 is a concave surface; both of the object side surface S110 and image side surface S111 of the fifth lens L15 are spherical surfaces; and both of the object side surface S112 and image side surface S113 of the sixth lens L16 are aspheric surfaces.

With the above design of the lenses, stop ST1, and at least one of the conditions (1)-(8) satisfied, the wide-angle lens assembly 1 can have an effective decreased total lens length, an effective decreased volume of the wide-angle lens assembly, an effective increased field of view, an effective increased resolution, an effective resisted environment temperature change, and an effective corrected aberration.

Table 1 shows the optical specification of the wide-angle lens assembly 1 in FIG. 1.

TABLE 1

Effective Focal Length = 6.233 mm F-number = 1.642
Total Lens Length = 29.75 mm Field of View = 101.7 degrees

| Surface Number | Radius of Curvature (mm) | Thickness (mm) | Nd | Vd | Effective Focal Length (mm) | Remark |
|---|---|---|---|---|---|---|
| S11 | −160.989 | 0.703 | 1.59 | 67 | −7.243 | L11 |
| S12 | 4.433 | 1.625 | | | | |
| S13 | 29.705 | 2.889 | 1.95 | 16.5 | 38.000 | L12 |
| S14 | 150.000 | 0.695 | | | | |
| S15 | ∞ | 2.219 | | | | ST1 |
| S16 | 19.512 | 2.610 | 1.62 | 64 | 10.168 | L13 |
| S17 | −8.873 | 0.057 | | | | |
| S18 | −7244.374 | 2.332 | 1.5 | 82 | 20.764 | L14 |
| S19 | −10.391 | 0.057 | | | | |
| S110 | −13.854 | 0.482 | 1.76 | 26 | −9.344 | L15 |
| S111 | 15.000 | 1.186 | | | | |
| S112 | 25.000 | 3.041 | 1.88 | 37 | 10.681 | L16 |
| S113 | −14.313 | 0.057 | | | | |
| S114 | 22.693 | 3.669 | 1.73 | 55 | 13.494 | L17 |
| S115 | −16.312 | 0.057 | | | | |
| S116 | −42.649 | 2.601 | 1.8 | 26 | −11.779 | L18 |
| S117 | 12.536 | 5.470 | | | | |

In the first embodiment, the conic constant k and the aspheric coefficients A, B, C, D of each aspheric lens are shown in Table 2.

TABLE 2

| Surface Number | k | A | B | C | D |
|---|---|---|---|---|---|
| S16 | −4.94E−01 | −4.10E−04 | 3.42E−07 | 2.62E−07 | −5.81E−09 |
| S17 | −9.17E−03 | −1.50E−04 | −3.38E−06 | 3.16E−07 | −3.99E−09 |
| S112 | −1.04E+01 | −5.83E−05 | −1.41E−06 | 1.08E−07 | −1.00E−09 |
| S113 | −8.09E−01 | 1.05E−04 | −2.05E−06 | 7.22E−08 | −2.48E−10 |

Table 3 shows the parameters and condition values for conditions (1)-(8) in accordance with the first embodiment of the invention. It can be seen from Table 3 that the wide-angle lens assembly 1 of the first embodiment satisfies the conditions (1)-(8).

TABLE 3

| BFL | 5.47 mm | (Ra + Rc)/Vdb | 1.31 mm | fb + Rc | −21.89 mm |
|---|---|---|---|---|---|
| Ra/fc | −12.73 | Rb/Rc | 169.86 | TTL/BFL | 5.44 |
| f1/f | −1.16 | Vd4/Vd5 | 3.15 | Rd + Rc | −56.96 mm |

Figure 2A:
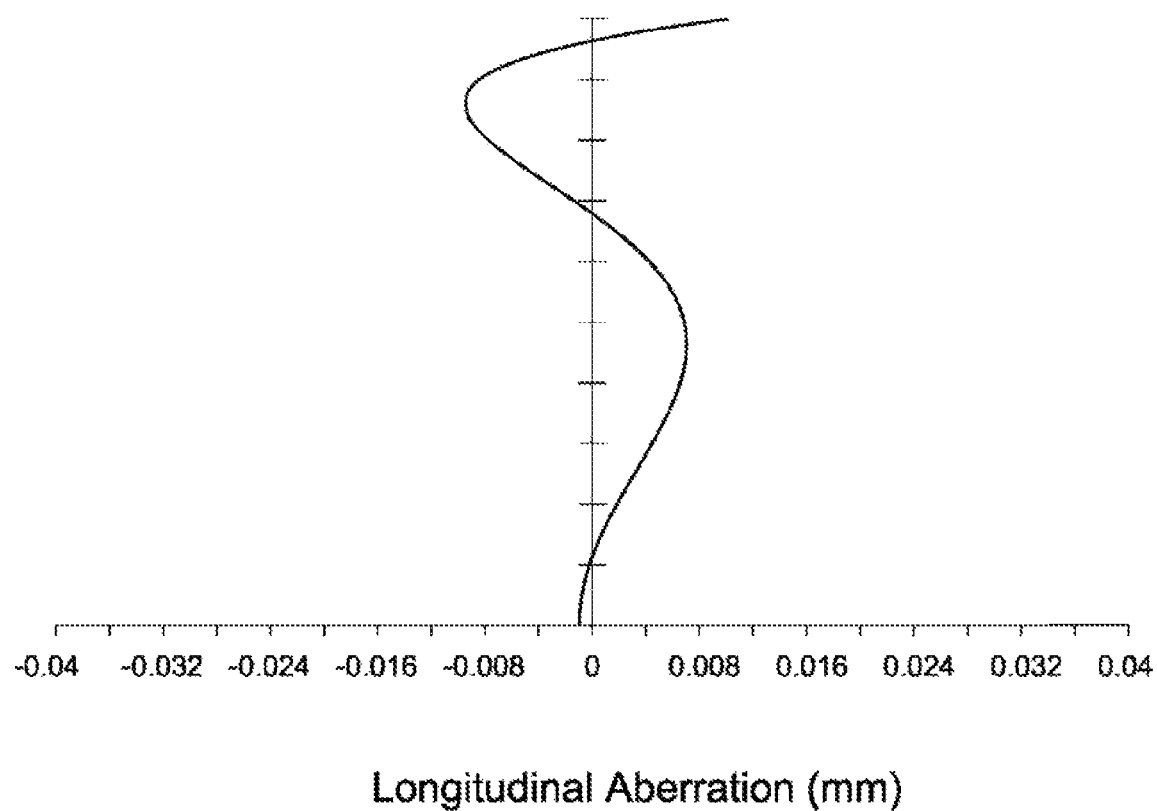
FIG. 2A, FIG. 2B, and FIG. 2C depict a longitudinal aberration diagram, a field curvature diagram, and a distortion diagram of the wide-angle lens assembly in accordance with the first embodiment of the invention, respectively.
Figure 2B:
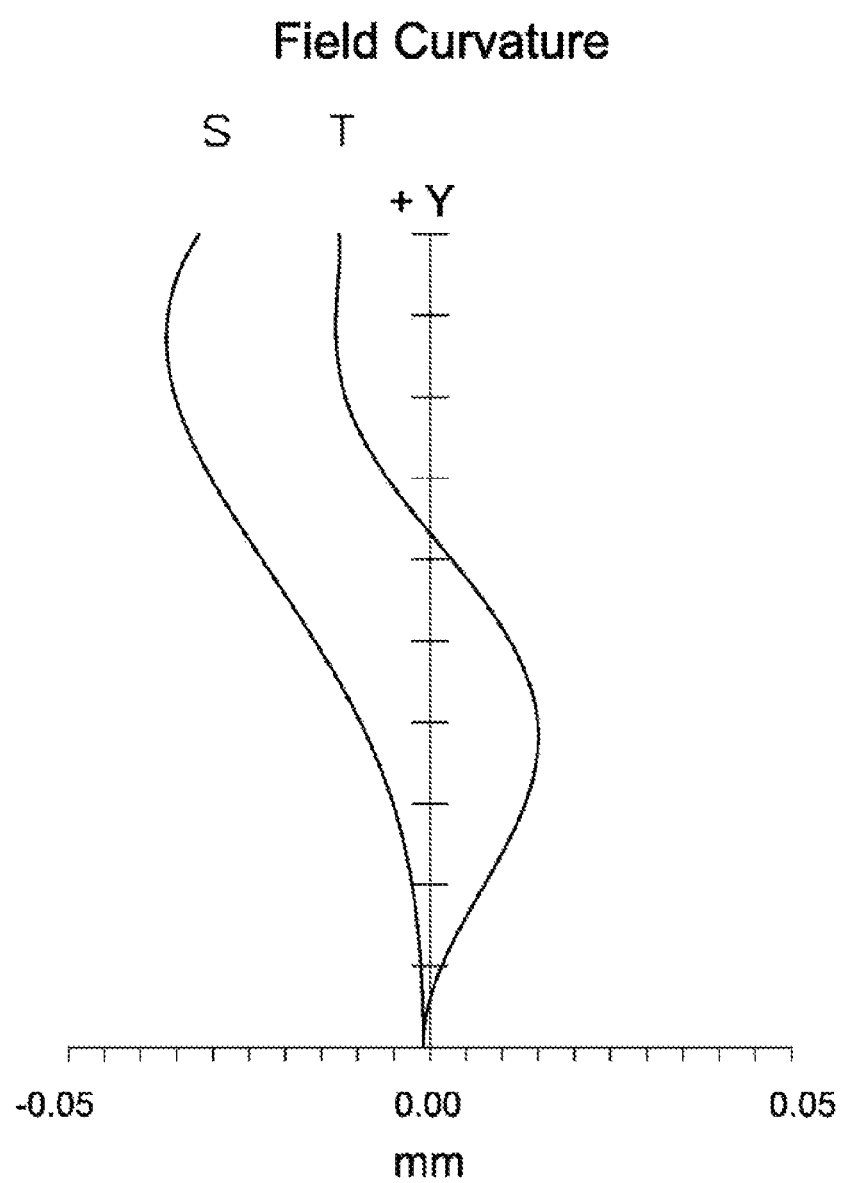
Figure 2C:
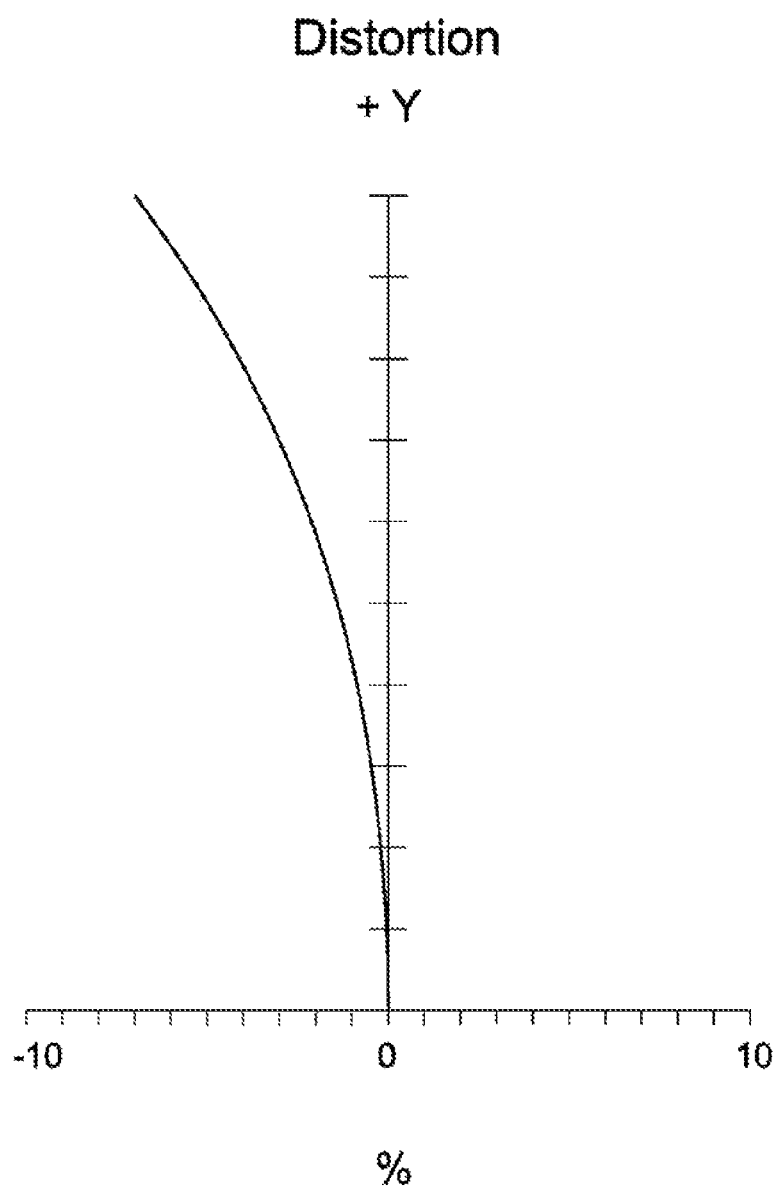

In addition, the wide-angle lens assembly 1 of the first embodiment can meet the requirements of optical performance as seen in FIGS. 2A-2C. It can be seen from FIG. 2A that the longitudinal aberration in the wide-angle lens assembly 1 of the first embodiment ranges from −0.012 mm to 0.012 mm. It can be seen from FIG. 2B that the field curvature of tangential direction and sagittal direction in the wide-angle lens assembly 1 of the first embodiment ranges from −0.04 mm to 0.02 mm. It can be seen from FIG. 2C that the distortion in the wide-angle lens assembly 1 of the first embodiment ranges from −8% to 0%. It is obvious that the longitudinal aberration, the field curvature, and the distortion of the wide-angle lens assembly 1 of the first embodiment can be corrected effectively. Therefore, the wide-angle lens assembly 1 of the first embodiment is capable of good optical performance.

Figure 3:
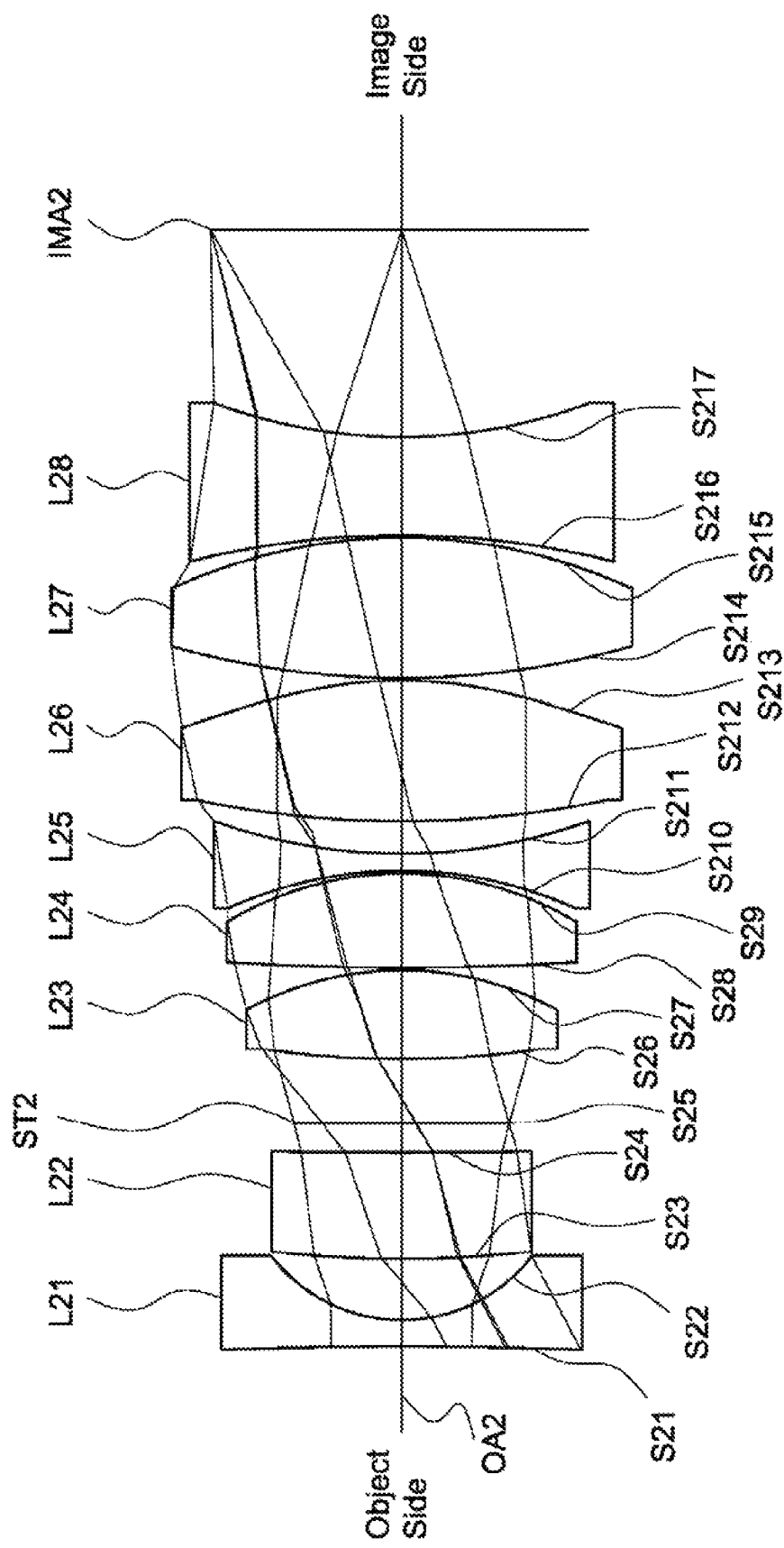

Referring to FIG. 3, the wide-angle lens assembly 2 includes a first lens L21, a second lens L22, a stop ST2, a third lens L23, a fourth lens L24, a fifth lens L25, a sixth lens L26, a seventh lens L27, and an eighth lens L28, all of which are arranged in order from an object side to an image side along an optical axis OA2. In operation, the light from the object side is imaged on an image plane IMA2.

According to the foregoing, wherein: the second lens L22 is a meniscus lens, wherein the image side surface S24 is a concave surface; the fourth lens L24 is a biconvex lens, wherein the object side surface S28 is a convex surface; both of the object side surface S210 and image side surface S211 of the fifth lens L25 are spherical surfaces; and both of the object side surface S212 and image side surface S213 of the sixth lens L26 are aspheric surfaces.

With the above design of the lenses, stop ST2, and at least one of the conditions (1)-(8) satisfied, the wide-angle lens assembly 2 can have an effective decreased total lens length, an effective decreased volume of the wide-angle lens assembly, an effective increased field of view, an effective increased resolution, an effective resisted environment temperature change, and an effective corrected aberration.

Table 4 shows the optical specification of the wide-angle lens assembly 2 in FIG. 3.

TABLE 4

Effective Focal Length = 6.236 mm F-number = 1.643
Total Lens Length = 30 mm Field of View = 101.67 degrees

| Surface Number | Radius of Curvature (mm) | Thickness (mm) | Nd | Vd | Effective Focal Length (mm) | Remark |
|---|---|---|---|---|---|---|
| S21 | −119.871 | 0.700 | 1.6 | 67 | −7.084 | L21 |
| S22 | 4.429 | 1.652 | | | | |
| S23 | 32.546 | 2.853 | 2 | 16.5 | 38.000 | L22 |
| S24 | 203.644 | 0.788 | | | | |
| S25 | ∞ | 1.734 | | | | ST2 |
| S26 | 20.801 | 2.379 | 1.6 | 65 | 10.957 | L23 |
| S27 | −9.236 | 0.057 | | | | |
| S28 | 72.087 | 2.544 | 1.5 | 90 | 16.373 | L24 |
| S29 | −9.148 | 0.057 | | | | |
| S210 | −11.478 | 0.471 | 1.8 | 30 | −8.016 | L25 |
| S211 | 15.000 | 0.855 | | | | |
| S212 | 25.000 | 3.796 | 1.9 | 40 | 9.451 | L26 |

TABLE 4-continued

Effective Focal Length = 6.236 mm F-number = 1.643
Total Lens Length = 30 mm Field of View = 101.67 degrees

| Surface Number | Radius of Curvature (mm) | Thickness (mm) | Nd | Vd | Effective Focal Length (mm) | Remark |
|---|---|---|---|---|---|---|
| S213 | −12.046 | 0.057 | | | | |
| S214 | 22.703 | 3.827 | 1.75 | 50 | 12.218 | L27 |
| S215 | −14.340 | 0.057 | | | | |
| S216 | −22.607 | 2.601 | 1.8 | 25 | −10.592 | L28 |
| S217 | 14.414 | 5.572 | | | | |

In the second embodiment, the conic constant k and the aspheric coefficients A, B, C, D of each aspheric lens are shown in Table 5.

TABLE 5

| Surface Number | k | A | B | C | D |
|---|---|---|---|---|---|
| S26 | −1.48E+00 | −4.31E−04 | −6.29E−06 | 9.89E−07 | −1.88E−08 |
| S27 | 2.73E−01 | −2.33E−04 | −4.96E−06 | 5.19E−07 | 4.72E−10 |
| S212 | −1.24E+01 | −6.18E−05 | 4.16E−08 | 1.70E−07 | −2.06E−09 |
| S213 | −7.30E−01 | 9.99E−05 | −9.26E−07 | 6.13E−08 | 5.65E−10 |

Table 6 shows the parameters and condition values for conditions (1)-(8) in accordance with the second embodiment of the invention. It can be seen from Table 6 that the wide-angle lens assembly 2 of the second embodiment satisfies the conditions (1)-(8).

TABLE 6

| BFL | 5.57 mm | (Ra + Rc)/Vdb | 2.01 mm | fb + Rc | −6.23 mm |
|---|---|---|---|---|---|
| Ra/fc | −19.23 | Rb/Rc | −3.19 | TTL/BFL | 5.38 |
| f1/f | −1.14 | Vd4/Vd5 | 3.00 | Rd + Rc | −34.65 mm |

Figure 4A:
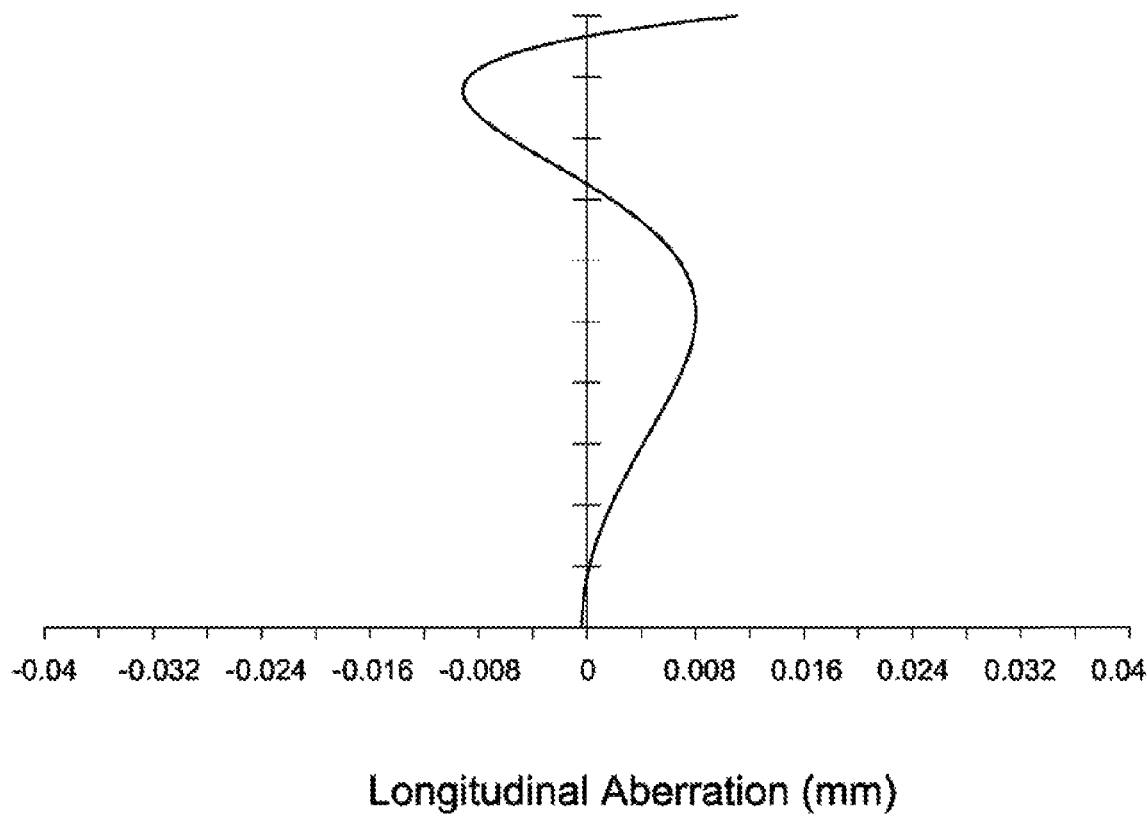
FIG. 4A, FIG. 4B, and FIG. 4C depict a longitudinal aberration diagram, a field curvature diagram, and a distortion diagram of the wide-angle lens assembly in accordance with the second embodiment of the invention, respectively.
Figure 4B:
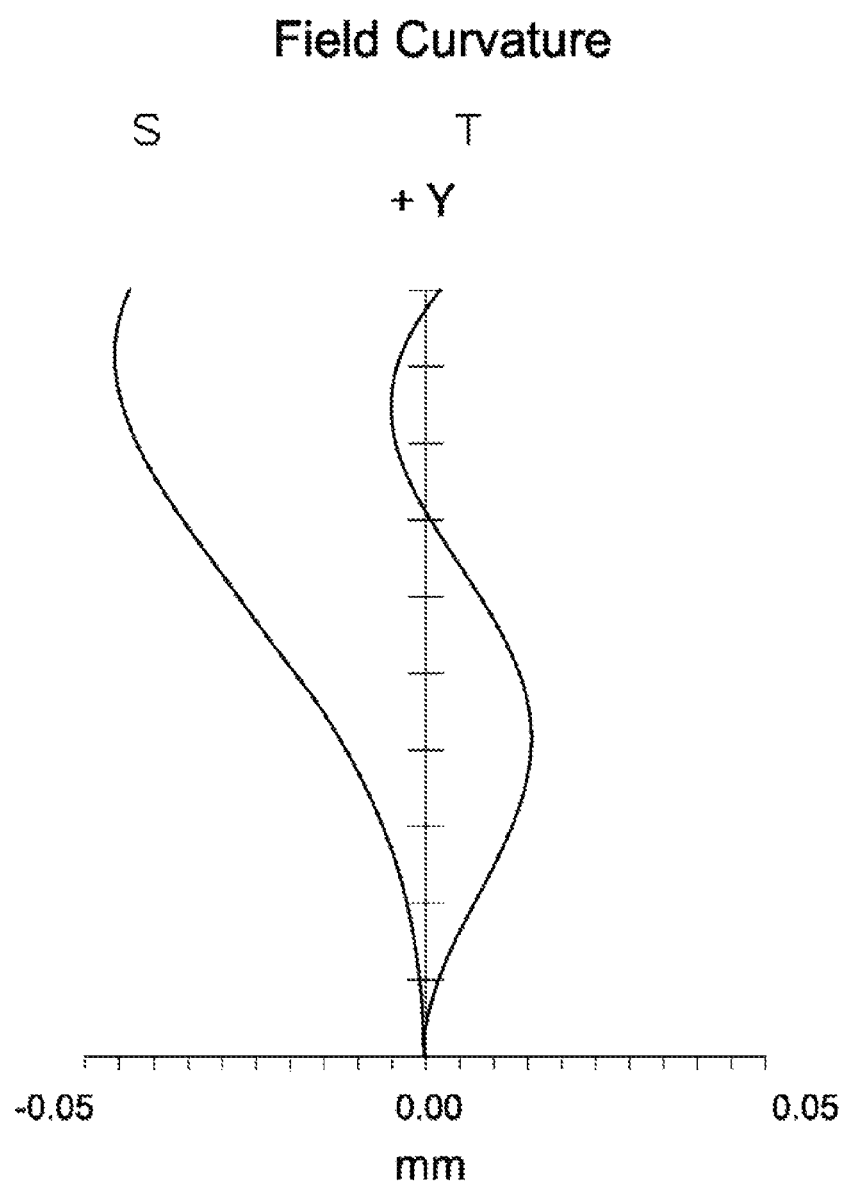
Figure 4C:
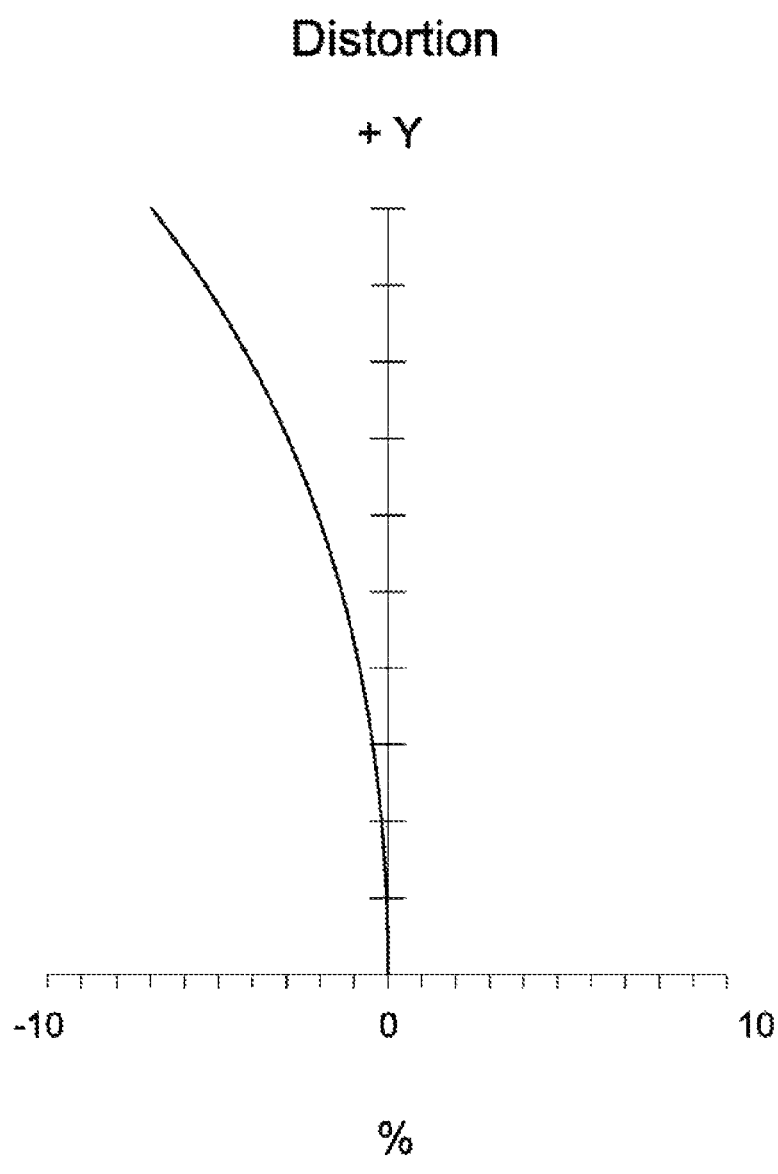

In addition, the wide-angle lens assembly 2 of the second embodiment can meet the requirements of optical performance as seen in FIGS. 4A-4C. It can be seen from FIG. 4A that the longitudinal aberration in the wide-angle lens assembly 2 of the second embodiment ranges from −0.012 mm to 0.012 mm. It can be seen from FIG. 4B that the field curvature of tangential direction and sagittal direction in the wide-angle lens assembly 2 of the second embodiment ranges from −0.05 mm to 0.02 mm. It can be seen from FIG. 4C that the distortion in the wide-angle lens assembly 2 of the second embodiment ranges from −8% to 0%. It is obvious that the longitudinal aberration, the field curvature, and the distortion of the wide-angle lens assembly 2 of the second embodiment can be corrected effectively. Therefore, the wide-angle lens assembly 2 of the second embodiment is capable of good optical performance.

Figure 5:
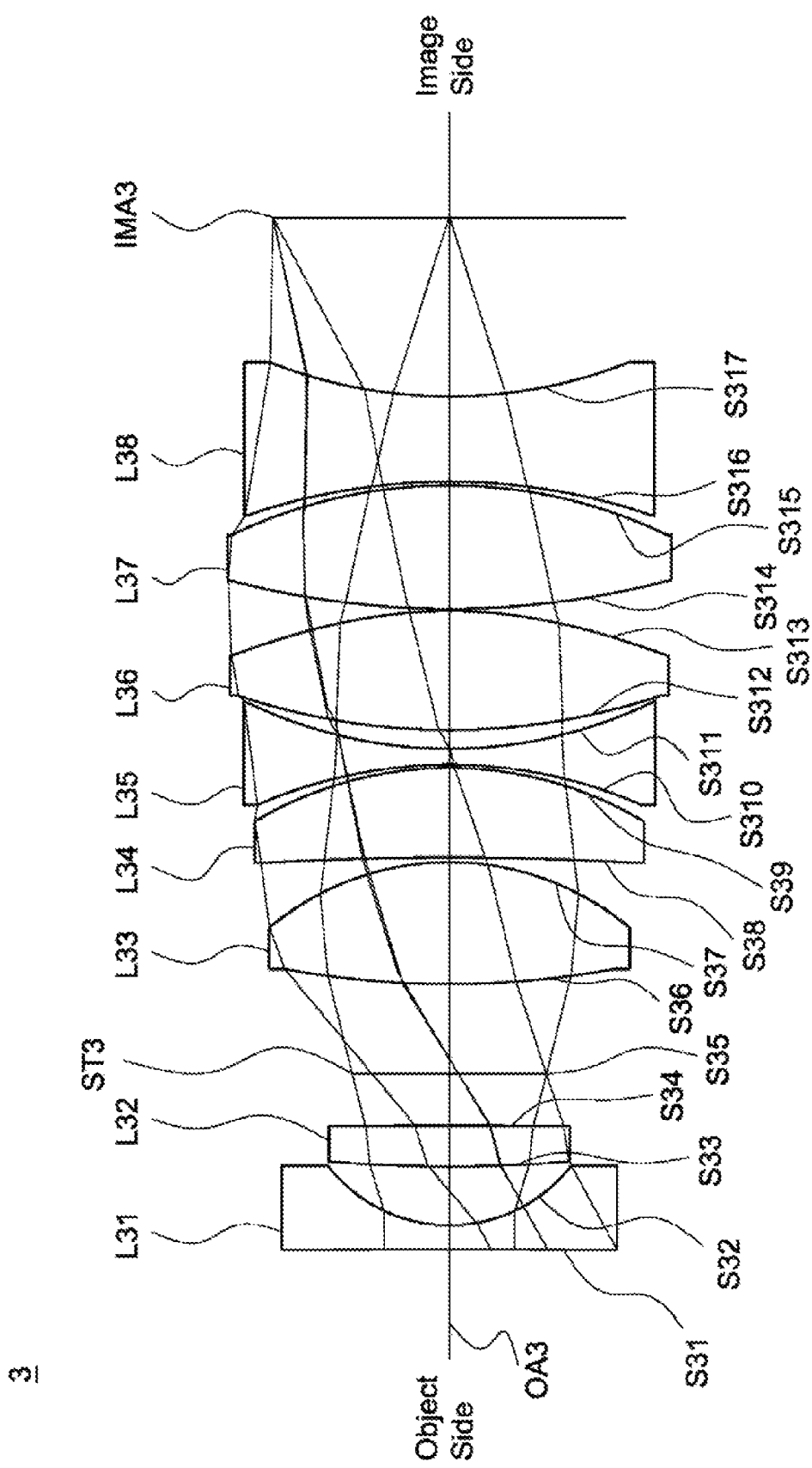

Referring to FIG. 5, the wide-angle lens assembly 3 includes a first lens L31, a second lens L32, a stop ST3, a third lens L33, a fourth lens L34, a fifth lens L35, a sixth lens L36, a seventh lens L37, and an eighth lens L38, all of which are arranged in order from an object side to an image side along an optical axis OA3. In operation, the light from the object side is imaged on an image plane IMA3.

According to the foregoing, wherein: the second lens L32 is a biconvex lens, wherein the image side surface S34 is a convex surface; the fourth lens L34 is a meniscus lens, wherein the object side surface S38 is a concave surface; both of the object side surface S310 and image side surface S311 of the fifth lens L35 are spherical surfaces; and both of the object side surface S312 and image side surface S313 of the sixth lens L36 are aspheric surfaces.

With the above design of the lenses, stop ST3, and at least one of the conditions (1)-(8) satisfied, the wide-angle lens assembly 3 can have an effective decreased total lens length, an effective decreased volume of the wide-angle lens assembly, an effective increased field of view, an effective increased resolution, an effective resisted environment temperature change, and an effective corrected aberration.

Table 7 shows the optical specification of the wide-angle lens assembly 3 in FIG. 5.

TABLE 7

Effective Focal Length = 6.232 mm F-number = 1.644
Total Lens Length = 29.942 mm Field of View = 101.725 degrees

| Surface Number | Radius of Curvature (mm) | Thickness (mm) | Nd | Vd | Effective Focal Length (mm) | Remark |
|---|---|---|---|---|---|---|
| S31 | −402.260 | 0.700 | 1.6 | 70 | −7.473 | L31 |
| S32 | 4.549 | 1.694 | | | | |
| S33 | 44.926 | 1.186 | 2 | 17 | 40.002 | L32 |
| S34 | −398.150 | 1.497 | | | | |
| S35 | ∞ | 2.601 | | | | ST3 |
| S36 | 19.203 | 3.590 | 1.6 | 60 | 9.446 | L33 |
| S37 | −7.508 | 0.105 | | | | |
| S38 | −92.012 | 2.592 | 1.5 | 90 | 25.005 | L34 |
| S39 | −11.130 | 0.098 | | | | |
| S310 | −13.981 | 0.498 | 1.8 | 25 | −8.607 | L35 |
| S311 | 13.981 | 0.508 | | | | |
| S312 | 20.009 | 3.450 | 1.9 | 40 | 9.580 | L36 |
| S313 | −14.022 | 0.089 | | | | |
| S314 | 26.004 | 3.592 | 1.7 | 50 | 13.699 | L37 |
| S315 | −14.409 | 0.063 | | | | |
| S316 | −18.430 | 2.474 | 1.7 | 30 | −11.047 | L38 |
| S317 | 14.209 | 5.205 | | | | |

In the third embodiment, the conic constant k and the aspheric coefficients A, B, C, D of each aspheric lens are shown in Table 8.

TABLE 8

| Surface Number | k | A | B | C | D |
|---|---|---|---|---|---|
| S36 | 3.30E+00 | −3.98E−04 | 2.25E−06 | −8.19E−08 | 3.46E−10 |
| S37 | −3.73E−01 | 1.61E−04 | −4.95E−06 | 1.43E−07 | −2.36E−09 |

TABLE 8-continued

| Surface Number | k | A | B | C | D |
|---|---|---|---|---|---|
| S312 | 1.71E−01 | 1.80E−05 | −8.88E−07 | 1.85E−08 | −5.55E−12 |
| S313 | −5.77E−01 | 9.89E−05 | −4.86E−08 | 1.47E−08 | −1.42E−10 |

Table 9 shows the parameters and condition values for conditions (1)-(8) in accordance with the third embodiment of the invention. It can be seen from Table 9 that the wide-angle lens assembly 3 of the third embodiment satisfies the conditions (1)-(8).

TABLE 9

| BFL | 5.21 mm | (Ra + Rc)/Vdb | −4.62 mm | fb + Rc | 6.58 mm |
|---|---|---|---|---|---|
| Ra/fc | 36.04 | Rb/Rc | 4.99 | TTL/BFL | 5.75 |
| f1/f | −1.20 | Vd4/Vd5 | 3.60 | Rd + Rc | −32.45 mm |

Figure 6A:
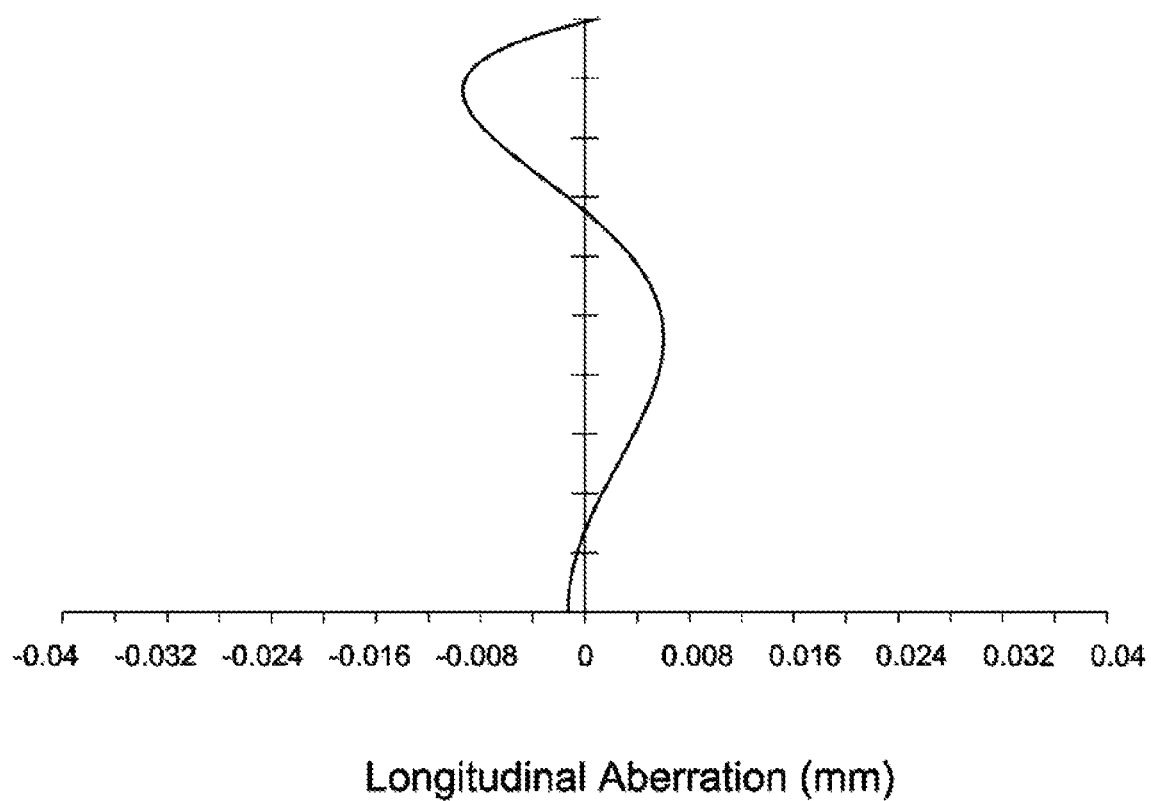
FIG. 6A, FIG. 6B, and FIG. 6C depict a longitudinal aberration diagram, a field curvature diagram, and a distortion diagram of the wide-angle lens assembly in accordance with the third embodiment of the invention, respectively.
Figure 6B:
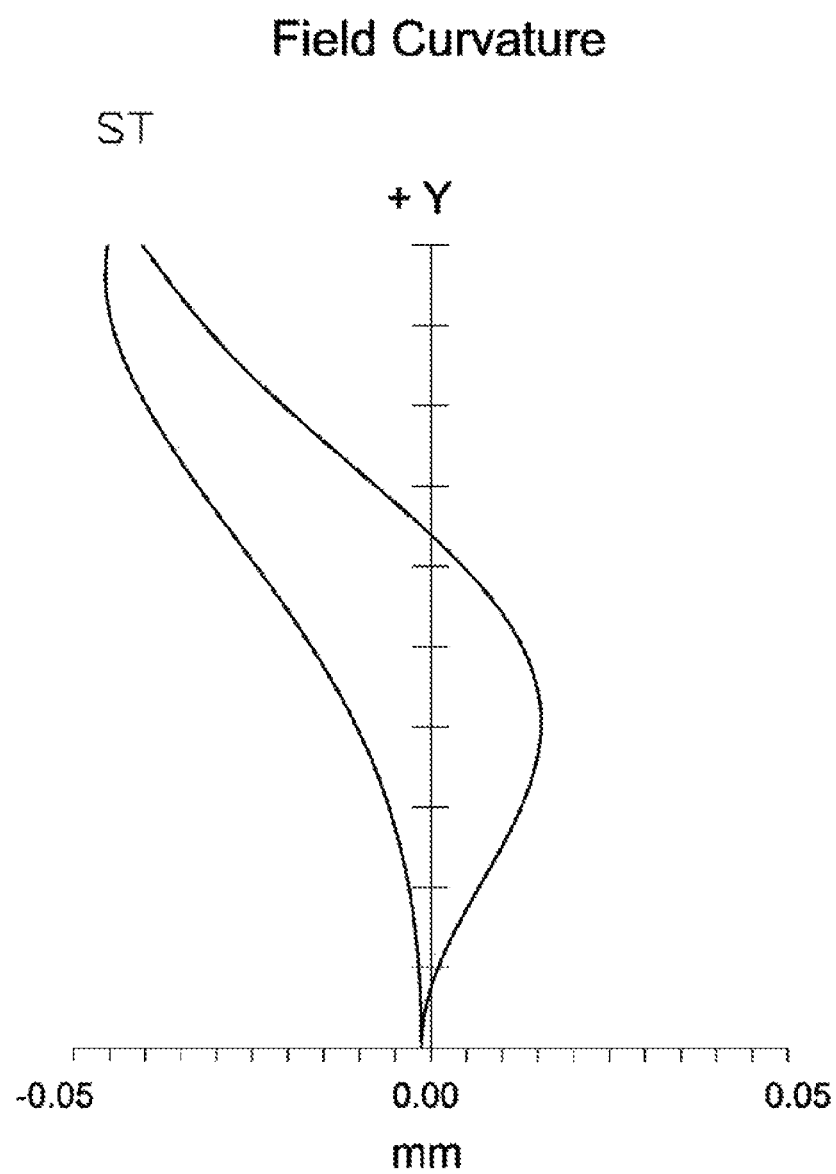
Figure 6C:
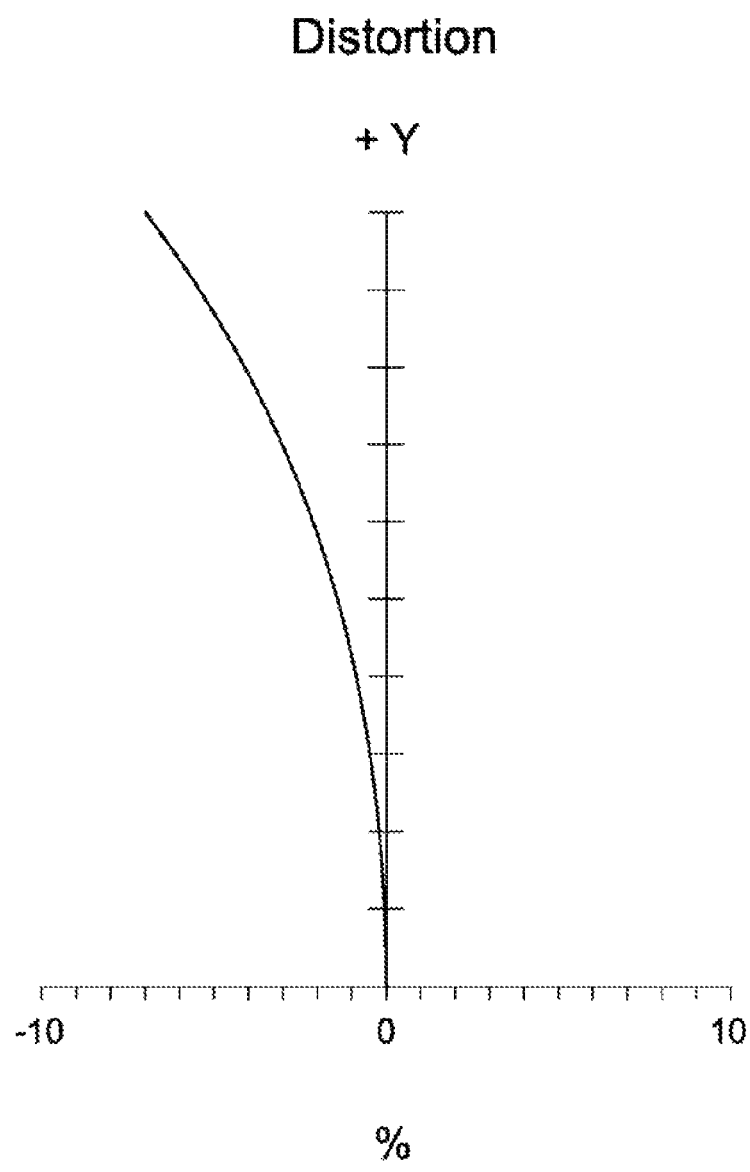

In addition, the wide-angle lens assembly 3 of the third embodiment can meet the requirements of optical performance as seen in FIGS. 6A-6C. It can be seen from FIG. 6A that the longitudinal aberration in the wide-angle lens assembly 3 of the third embodiment ranges from −0.012 mm to 0.008 mm. It can be seen from FIG. 6B that the field curvature of tangential direction and sagittal direction in the wide-angle lens assembly 3 of the third embodiment ranges from −0.05 mm to 0.02 mm. It can be seen from FIG. 6C that the distortion in the wide-angle lens assembly 3 of the third embodiment ranges from −8% to 0%. It is obvious that the longitudinal aberration, the field curvature, and the distortion of the wide-angle lens assembly 3 of the third embodiment can be corrected effectively. Therefore, the wide-angle lens assembly 3 of the third embodiment is capable of good optical performance.

Figure 7:
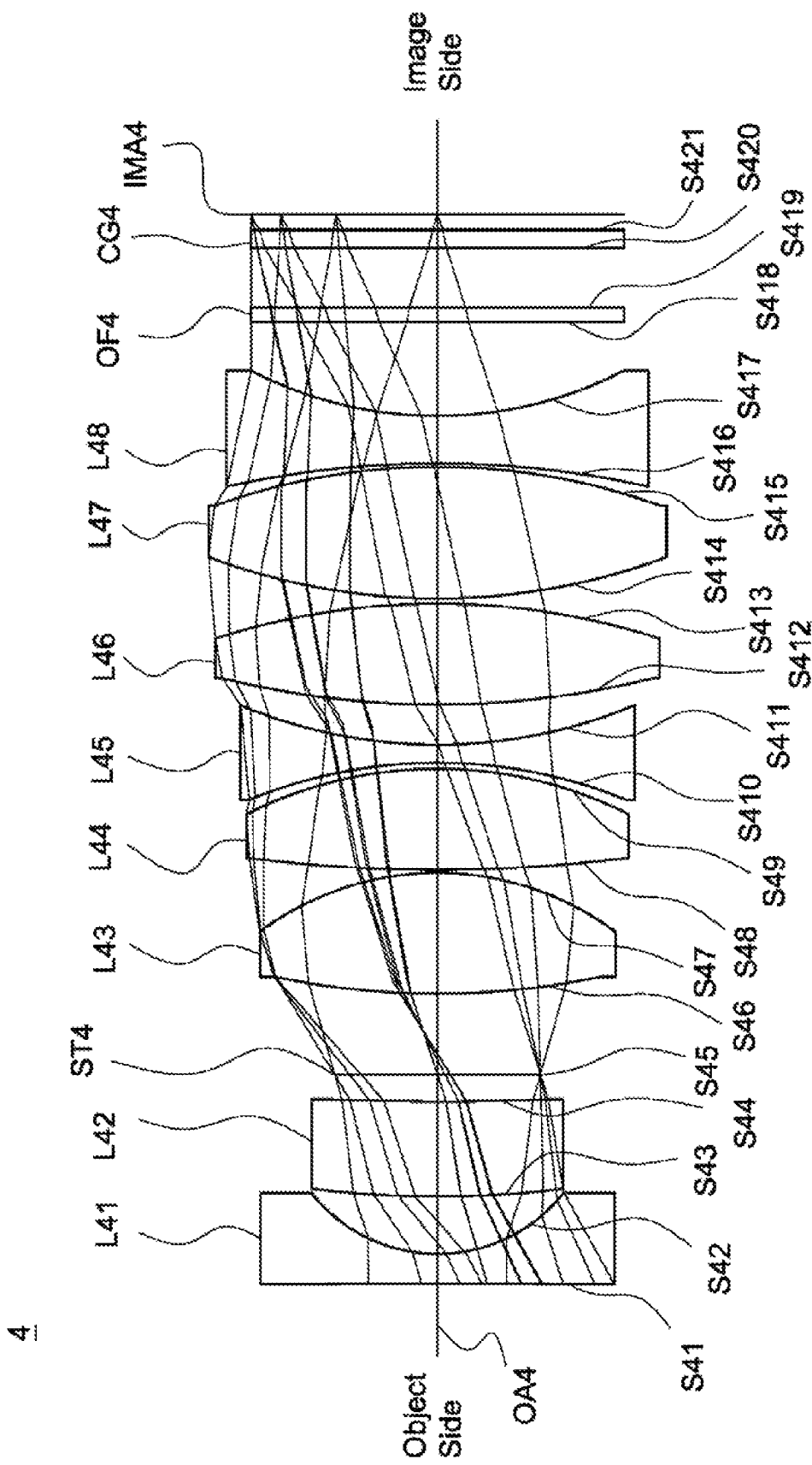

Referring to FIG. 7, the wide-angle lens assembly 4 includes a first lens L41, a second lens L42, a stop ST4, a third lens L43, a fourth lens L44, a fifth lens L45, a sixth lens L46, a seventh lens L47, an eighth lens L48, an optical filter OF4, and a cover glass CG4, all of which are arranged in order from an object side to an image side along an optical axis OA4. In operation, the light from the object side is imaged on an image plane IMA4.

According to the foregoing, wherein: the second lens L42 is a meniscus lens, wherein the image side surface S44 is a concave surface; the fourth lens L44 is a biconvex lens, wherein the object side surface S48 is a convex surface; both of the object side surface S410 and image side surface S411 of the fifth lens L45 are aspheric surfaces; both of the object side surface S412 and image side surface S413 of the sixth lens L46 are spherical surfaces; both of the object side surface S418 and image side surface S419 of the optical filter OF4 are plane surfaces; and both of the object side surface S420 and image side surface S421 of the cover glass CG4 are plane surfaces.

With the above design of the lenses, stop ST4, and at least one of the conditions (1)-(8) satisfied, the wide-angle lens assembly 4 can have an effective decreased total lens length, an effective decreased volume of the wide-angle lens assembly, an effective increased field of view, an effective increased resolution, an effective resisted environment temperature change, and an effective corrected aberration.

Table 10 shows the optical specification of the wide-angle lens assembly 4 in FIG. 7.

TABLE 10

Effective Focal Length = 6.236 mm  F-number = 1.64
Total Lens Length = 29.746 mm  Field of View = 101.68 degrees

| Surface Number | Radius of Curvature (mm) | Thickness (mm) | Nd | Vd | Effective Focal Length (mm) | Remark |
|---|---|---|---|---|---|---|
| S41 | −206.813 | 0.800 | 1.593 | 67.327 | −7.238 | L41 |
| S42 | 4.405 | 1.605 | | | | |
| S43 | 29.759 | 2.642 | 1.986 | 16.484 | 42.806 | L42 |
| S44 | 94.006 | 0.736 | | | | |
| S45 | ∞ | 2.271 | | | | ST4 |
| S46 | 17.965 | 3.357 | 1.617 | 63.115 | 9.285 | L43 |
| S47 | −7.848 | 0.099 | | | | |
| S48 | 44.038 | 2.840 | 1.459 | 90.195 | 19.836 | L44 |
| S49 | −11.261 | 0.098 | | | | |
| S410 | −13.987 | 0.545 | 1.805 | 25.477 | −8.550 | L45 |
| S411 | 13.987 | 1.074 | | | | |
| S412 | 21.616 | 2.879 | 1.879 | 36.979 | 10.836 | L46 |
| S413 | −16.092 | 0.100 | | | | |
| S414 | 17.812 | 3.677 | 1.755 | 52.329 | 12.303 | L47 |
| S415 | −17.812 | 0.098 | | | | |
| S416 | −26.000 | 1.325 | 1.699 | 30.053 | −10.962 | L48 |
| S417 | 11.187 | 2.600 | | | | |
| S418 | ∞ | 0.400 | 1.517 | 64.167 | | OF4 |
| S419 | ∞ | 1.665 | | | | |
| S420 | ∞ | 0.500 | 1.517 | 64.167 | | CG4 |
| S421 | ∞ | 0.435 | | | | |

In the fourth embodiment, the conic constant k and the aspheric coefficients A, B, C, D of each aspheric lens are shown in Table 11.

TABLE 11

| Surface Number | k | A | B | C | D |
|---|---|---|---|---|---|
| S46 | 1.486.E+00 | −3.947.E−04 | 4.286.E−06 | 1.092.E−08 | −7.082.E−10 |
| S47 | −2.496.E−01 | −3.467.E−05 | −1.399.E−06 | 1.756.E−07 | −1.262.E−09 |
| S410 | 6.684.E+00 | −1.426.E−04 | −3.176.E−06 | 1.385.E−07 | −2.254.E−09 |
| S411 | −9.056.E+00 | −1.253.E−04 | 1.242.E−07 | 9.901.E−08 | −1.339.E−09 |

Table 12 shows the parameters and condition values for conditions (1)-(8) in accordance with the fourth embodiment of the invention. It can be seen from Table 12 that the wide-angle lens assembly 4 of the fourth embodiment satisfies the conditions (1)-(8).

TABLE 12

| BFL | 5.6 mm | (Ra + Rc)/Vdb | 0.75 mm | fb + Rc | −6.16 mm |
|---|---|---|---|---|---|
| Ra/fc | −8.02 | Rb/Rc | −1.69 | TTL/BFL | 5.31 |
| f1/f | −1.16 | Vd4/Vd5 | 3.54 | Rd + Rc | −42.09 mm |

Figure 8A:
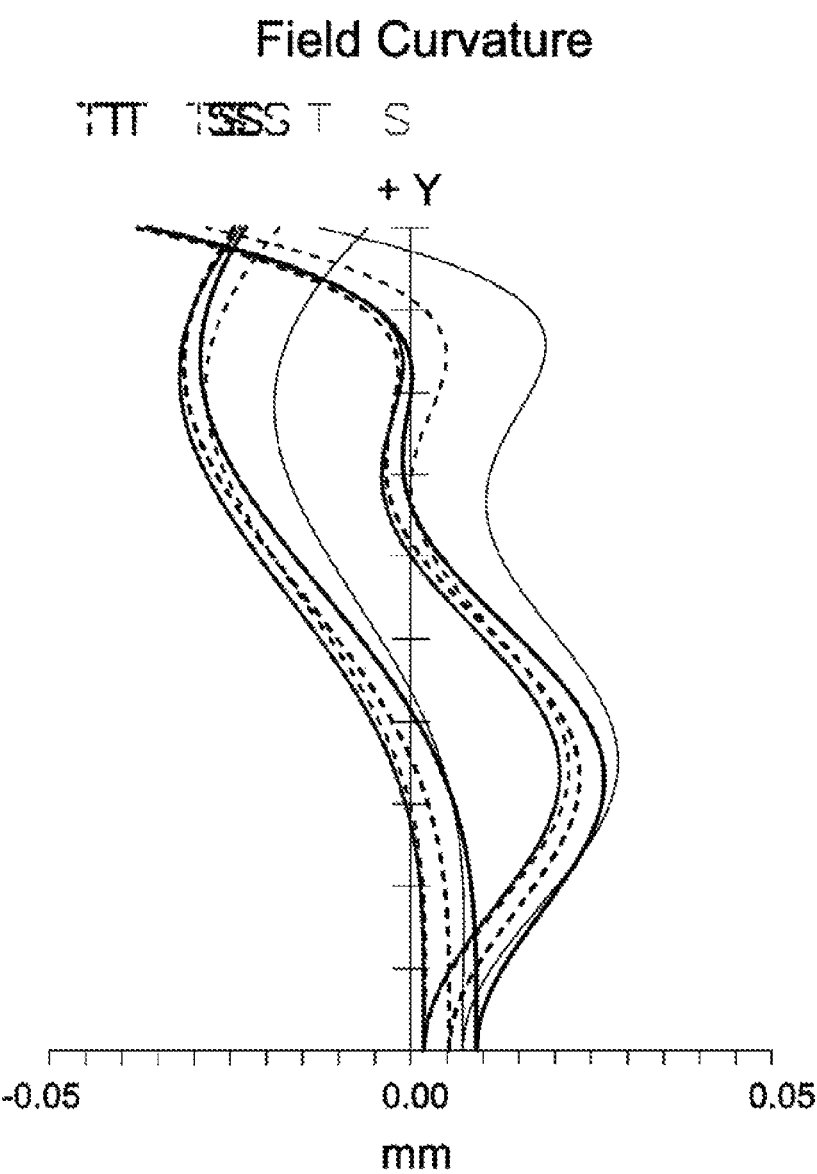
FIG. 8A, FIG. 8B, and FIG. 8C depict a field curvature diagram, a distortion diagram, and a modulation transfer function diagram of the wide-angle lens assembly in accordance with the fourth embodiment of the invention, respectively.
Figure 8B:
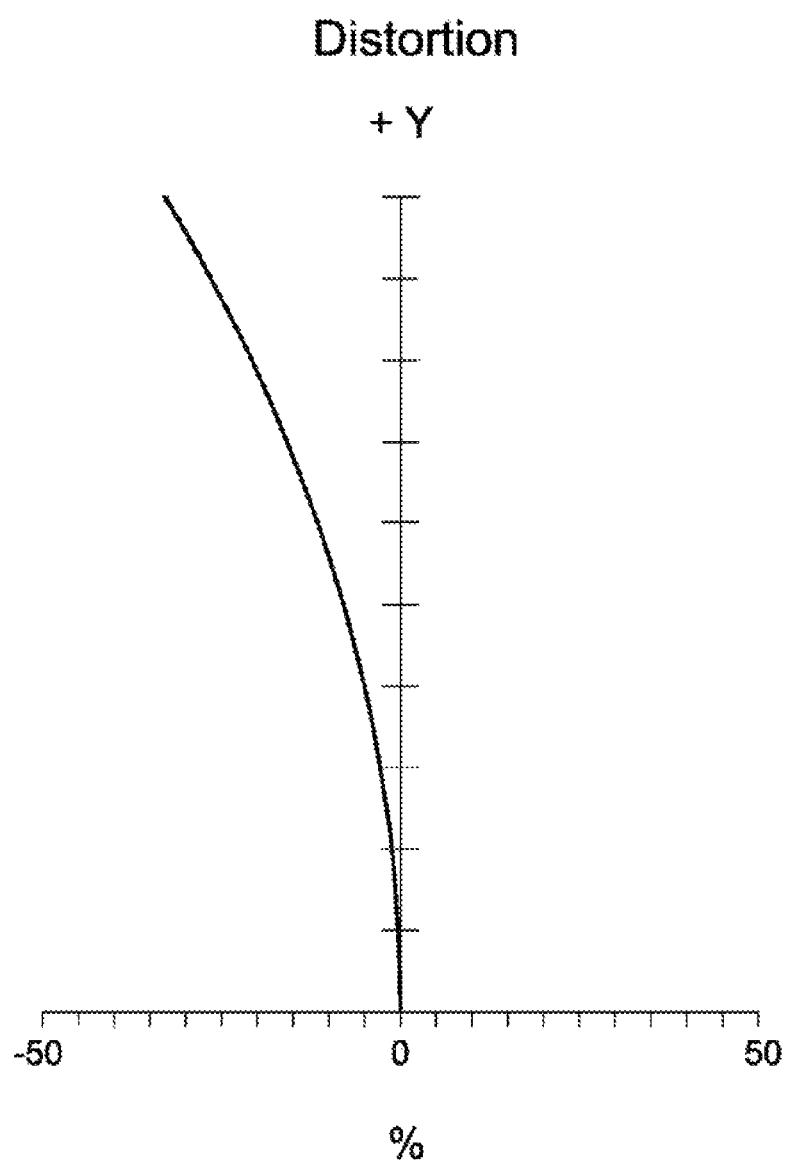
Figure 8C:
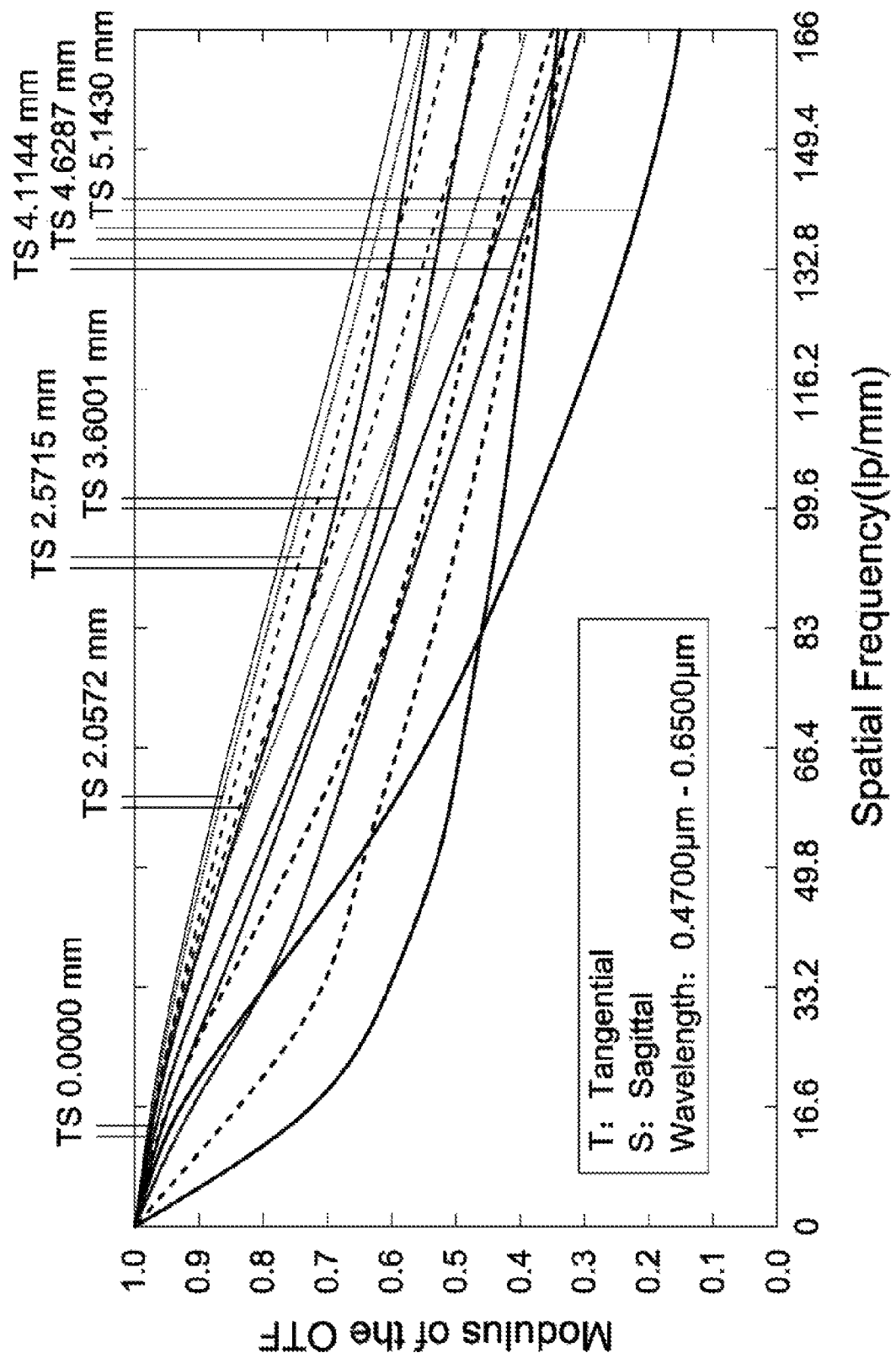

In addition, the wide-angle lens assembly 4 of the fourth embodiment can meet the requirements of optical performance as seen in FIGS. 8A-8C. It can be seen from FIG. 8A that the field curvature of tangential direction and sagittal direction in the wide-angle lens assembly 4 of the fourth embodiment ranges from −0.04 mm to 0.03 mm. It can be seen from FIG. 8B that the distortion in the wide-angle lens assembly 4 of the fourth embodiment ranges from −40% to 0%. It can be seen from FIG. 8C that the modulation transfer function in the wide-angle lens assembly 4 of the fourth embodiment ranges from 0.15 to 1.0. It is obvious that the field curvature and the distortion of the wide-angle lens assembly 4 of the fourth embodiment can be corrected effectively, the image resolution can meet the requirements. Therefore, the wide-angle lens assembly 4 of the fourth embodiment is capable of good optical performance.

The wide-angle lens assembly 5 (not shown) includes a first lens L51, a second lens L52, a stop ST5, a third lens L53, a fourth lens L54, a fifth lens L55, a sixth lens L56, a seventh lens L57, an eighth lens L58, an optical filter OF5, and a cover glass CG5, all of which are arranged in order from an object side to an image side along an optical axis OA5. In operation, the light from the object side is imaged on an image plane IMA5.

According to the foregoing, wherein: the second lens L52 is a biconvex lens, wherein the image side surface S54 is a convex surface; the fourth lens L54 is a biconvex lens, wherein the object side surface S58 is a convex surface; both of the object side surface S510 and image side surface S511 of the fifth lens L55 are aspheric surfaces; both of the object side surface S512 and image side surface S513 of the sixth lens L56 are spherical surfaces; both of the object side surface S518 and image side surface S519 of the optical filter OF5 are plane surfaces; and both of the object side surface S520 and image side surface S521 of the cover glass CG5 are plane surfaces.

With the above design of the lenses, stop ST5, and at least one of the conditions (1)-(8) satisfied, the wide-angle lens assembly 5 can have an effective decreased total lens length, an effective decreased volume of the wide-angle lens assembly, an effective increased field of view, an effective increased resolution, an effective resisted environment temperature change, and an effective corrected aberration.

Table 13 shows the optical specification of the wide-angle lens assembly 5 (not shown).

TABLE 13

Effective Focal Length = 6.234 mm F-number = 1.64
Total Lens Length = 29.592 mm Field of View = 101.60 degrees

| Surface Number | Radius of Curvature (mm) | Thickness (mm) | Nd | Vd | Effective Focal Length (mm) | Remark |
|---|---|---|---|---|---|---|
| S51 | −116.329 | 0.800 | 1.593 | 67.327 | −7.220 | L51 |
| S52 | 4.473 | 1.608 | | | | |
| S53 | 33.866 | 2.225 | 1.986 | 16.484 | 34.243 | L52 |
| S54 | −258.140 | 0.915 | | | | |
| S55 | ∞ | 2.452 | | | | ST5 |
| S56 | 20.816 | 3.199 | 1.617 | 63.115 | 9.777 | L53 |
| S57 | −8.032 | 0.098 | | | | |
| S58 | 113.854 | 3.052 | 1.459 | 90.195 | 19.514 | L54 |
| S59 | −9.652 | 0.097 | | | | |
| S510 | −13.528 | 0.500 | 1.805 | 25.477 | −8.273 | L55 |
| S511 | 13.528 | 0.704 | | | | |
| S512 | 20.789 | 2.787 | 1.879 | 36.979 | 11.113 | L56 |
| S513 | −17.416 | 0.099 | | | | |
| S514 | 17.573 | 3.840 | 1.755 | 52.329 | 12.170 | L57 |
| S515 | −17.573 | 0.098 | | | | |
| S516 | −55.772 | 1.519 | 1.699 | 30.053 | −11.727 | L58 |
| S517 | 9.785 | 1.600 | | | | |
| S518 | ∞ | 0.400 | 1.517 | 64.167 | | OF5 |
| S519 | ∞ | 2.664 | | | | |
| S520 | ∞ | 0.500 | 1.517 | 64.167 | | CG5 |
| S521 | ∞ | 0.435 | | | | |

In the fifth embodiment, the conic constant k and the aspheric coefficients A, B, C, D of each aspheric lens are shown in Table 14.

TABLE 14

| Surface Number | k | A | B | C | D |
|---|---|---|---|---|---|
| S56 | 1.530.E+00 | −3.544.E−04 | −1.760.E−06 | 4.388.E−07 | −5.884.E−09 |
| S57 | −2.651.E−01 | −3.889.E−05 | −1.049.E−06 | 1.353.E−07 | 4.461.E−09 |
| S510 | 4.408.E+00 | −1.212.E−04 | −4.023.E−06 | 2.174.E−07 | −2.398.E−09 |
| S511 | −1.187.E+01 | −1.149.E−04 | 7.068.E−07 | 8.042.E−08 | −2.573.E−10 |

Table 15 shows the parameters and condition values for conditions (1)-(8) in accordance with the fifth embodiment of the invention. It can be seen from Table 15 that the wide-angle lens assembly 5 (not shown) of the fifth embodiment satisfies the conditions (1)-(8).

TABLE 15

| BFL | 5.60 mm | (Ra + Rc)/Vdb | −3.48 mm | fb + Rc | −36.26 mm |
|---|---|---|---|---|---|
| Ra/fc | 22.01 | Rb/Rc | | −2.04 | TTL/BFL | 5.29 |
| f1/f | −1.16 | Vd4/Vd5 | 3.54 | Rd + Rc | −73.19 mm |

The wide-angle lens assembly 6 (not shown) includes a first lens L61, a second lens L62, a stop ST6, a third lens L63, a fourth lens L64, a fifth lens L65, a sixth lens L66, a seventh lens L67, an eighth lens L68, an optical filter OF6, and a cover glass CG6, all of which are arranged in order from an object side to an image side along an optical axis OA6. In operation, the light from the object side is imaged on an image plane IMA6.

According to the foregoing, wherein: the second lens L62 is a meniscus lens, wherein the image side surface S64 is a concave surface; the fourth lens L64 is a biconvex lens, wherein the object side surface S68 is a convex surface; both of the object side surface S610 and image side surface S611 of the fifth lens L65 are aspheric surfaces; both of the object side surface S612 and image side surface S613 of the sixth lens L66 are spherical surfaces; both of the object side surface S618 and image side surface S619 of the optical filter OF6 are plane surfaces; and both of the object side surface S620 and image side surface S621 of the cover glass CG6 are plane surfaces.

With the above design of the lenses, stop ST6, and at least one of the conditions (1)-(8) satisfied, the wide-angle lens assembly 6 (not shown) can have an effective decreased total lens length, an effective decreased volume of the wide-angle lens assembly, an effective increased field of view, an effective increased resolution, an effective resisted environment temperature change, and an effective corrected aberration.

Table 16 shows the optical specification of the wide-angle lens assembly 6 (not shown).

TABLE 16

Effective Focal Length = 6.231 mm F-number = 1.641
Total Lens Length = 30.001 mm Field of View = 101.64 degrees

| Surface Number | Radius of Curvature (mm) | Thickness (mm) | Nd | Vd | Effective Focal Length (mm) | Remark |
|---|---|---|---|---|---|---|
| S61 | −209.699 | 0.800 | 1.593 | 67.327 | −7.287 | L61 |
| S62 | 4.434 | 1.611 | | | | |
| S63 | 34.089 | 2.049 | 1.986 | 16.484 | 56.932 | L62 |
| S64 | 82.815 | 1.030 | | | | |
| S65 | ∞ | 2.343 | | | | ST6 |
| S66 | 17.707 | 3.547 | 1.617 | 63.115 | 9.293 | L63 |
| S67 | −7.868 | 0.429 | | | | |
| S68 | 42.771 | 3.232 | 1.459 | 90.195 | 19.393 | L64 |
| S69 | −10.989 | 0.100 | | | | |
| S610 | −14.168 | 0.500 | 1.805 | 25.477 | −8.668 | L65 |
| S611 | 14.168 | 0.824 | | | | |
| S612 | 21.316 | 2.882 | 1.879 | 36.979 | 11.027 | L66 |
| S613 | −16.785 | 0.100 | | | | |
| S614 | 17.854 | 3.623 | 1.755 | 52.329 | 12.322 | L67 |
| S615 | −17.854 | 0.100 | | | | |
| S616 | −21.003 | 1.231 | 1.699 | 30.053 | −11.210 | L68 |
| S617 | 12.923 | 1.600 | | | | |
| S618 | ∞ | 0.400 | 1.517 | 64.167 | | OF6 |
| S619 | ∞ | 2.665 | | | | |
| S620 | ∞ | 0.500 | 1.517 | 64.167 | | CG6 |
| S621 | ∞ | 0.435 | | | | |

In the sixth embodiment, the conic constant k and the aspheric coefficients A, B, C, D of each aspheric lens are shown in Table 17.

TABLE 17

| Surface Number | k | A | B | C | D |
|---|---|---|---|---|---|
| S66 | 1.428.E+00 | −3.884.E−04 | 5.182.E−06 | −3.805.E−08 | −6.769.E−10 |
| S67 | −3.051.E−01 | −6.746.E−06 | −1.477.E−06 | 1.808.E−07 | −2.423.E−09 |
| S610 | 5.797.E+00 | −9.535.E−05 | −2.843.E−06 | 1.356.E−07 | −2.962.E−09 |
| S611 | −1.075.E+01 | −1.308.E−04 | 6.314.E−07 | 1.234.E−07 | −2.579.E−09 |

Table 18 shows the parameters and condition values for conditions (1)-(8) in accordance with the sixth embodiment of the invention. It can be seen from Table 18 that the wide-angle lens assembly 6 (not shown) of the sixth embodiment satisfies the conditions (1)-(8).

TABLE 18

| BFL | 5.60 mm | (Ra + Rc)/Vdb | 0.69 mm | fb + Rc | −1.61 mm |
|---|---|---|---|---|---|
| Ra/fc | −7.39 | Rb/Rc | −2.04 | TTL/BFL | 5.36 |
| f1/f | −1.17 | Vd4/Vd5 | 3.54 | Rd + Rc | −37.79 mm |

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a first lens which is with negative refractive power and comprises a concave surface facing an object side;
   a second lens which is with refractive power;
   a third lens which is with refractive power;
   a fourth lens which is with positive refractive power and comprises a concave surface facing the object side and a convex surface facing an image side;
   a fifth lens which is with negative refractive power;
   a sixth lens which is with positive refractive power and comprises a convex surface facing the image side;
   a seventh lens which is with positive refractive power and comprise a convex surface facing the object side and a convex surface facing the image side; and
   an eighth lens which is with negative refractive power and comprises a concave surface facing the object side;
   wherein the first lens, the second lens, the third lens, the fourth lens, the fifth lens, the sixth lens, the seventh lens, and the eighth lens are arranged in order from the object side to the image side along an optical axis.

2. The wide-angle lens assembly as claimed in claim 1, further comprising a stop disposed between the second lens and the third lens;
   wherein the wide-angle lens assembly satisfies at least one of following conditions:

$-4.8 \text{ mm} < (Ra+Rc)/Vdb < 2.1 \text{ mm}$;

$-4 < Rb/Rc < 170$;

$-75.22 \text{ mm} \leq Rd+Rc < -30.41 \text{ mm}$;

$-37 \text{ mm} \leq fb+Rc < 7 \text{ mm}$;

$-20 < Ra/fc < 37$;

$5.2 < TTL/BFL < 5.8$;

−1.3<f1/f<−1.1;

2.9<Vd4/Vd5<3.7;

wherein Ra is a radius of curvature of an image side surface of a lens, and the lens is closest to the stop among all the lenses disposed between the object side and the stop; Rc is a radius of curvature of an object side surface of a lens, fc is an effective focal length of the lens, and the lens is closest to an image plane among all the lenses disposed between the stop and the image side; Vdb is an Abbe number of a lens, Rb is a radius of curvature of an object side surface of the lens, fb is an effective focal length of the lens, and the lens is second closest to the stop among all the lenses disposed between the stop and the image side; Rd is a radius of curvature of an image side surface of a lens, and the lens is third closest to the image plane among all the lenses disposed between the stop and the image side; TTL is an interval from an object side surface of the first lens to the image plane along the optical axis; BFL is an interval from an image side surface of the eighth lens to the image plane along the optical axis; f1 is an effective focal length of the first lens; f is an effective focal length of the wide-angle lens assembly; Vd4 is an Abbe number of the fourth lens; and Vd5 is an Abbe number of the fifth lens.

3. A wide-angle lens assembly comprising:
a first lens which is with negative refractive power and comprises a concave surface facing an object side;
a second lens which is with positive refractive power;
a third lens which is with refractive power;
a fourth lens which is with refractive power and comprises a convex surface facing an image side;
a fifth lens which is with negative refractive power;
a sixth lens which is with positive refractive power and comprises a convex surface facing the image side;
a seventh lens which is a biconvex lens with positive refractive power and comprises a convex surface facing the object side and a convex surface facing the image side; and
an eighth lens which is a biconcave lens with negative refractive power and comprises a concave surface facing the object side and a concave surface facing the image side;
wherein the first lens, the second lens, the third lens, the fourth lens, the fifth lens, the sixth lens, the seventh lens, and the eighth lens are arranged in order from the object side to the image side along an optical axis.

4. The wide-angle lens assembly as claimed in claim 3, wherein the second lens comprises a convex surface facing the object side.

5. The wide-angle lens assembly as claimed in claim 4, wherein the second lens further comprises a concave surface facing the image side.

6. The wide-angle lens assembly as claimed in claim 5, further comprising a stop disposed between the second lens and the third lens;
wherein the wide-angle lens assembly satisfies at least one of following conditions:

−4.8 mm<(Ra+Rc)/Vdb<2.1 mm;

−4<Rb/Rc<170;

−75.22 mm<Rd+Rc<−30.41 mm;

−37 mm≤fb+Rc<7 mm;

−20<Ra/fc<37;

5.2<TTL/BFL<5.8;

−1.3<f1/f<−1.1;

2.9<Vd4/Vd5<3.7;

wherein Ra is a radius of curvature of an image side surface of a lens, and the lens is closest to the stop among all the lenses disposed between the object side and the stop; Rc is a radius of curvature of an object side surface of a lens, fc is an effective focal length of the lens, and the lens is closest to an image plane among all the lenses disposed between the stop and the image side; Vdb is an Abbe number of a lens, Rb is a radius of curvature of an object side surface of the lens, fb is an effective focal length of the lens, and the lens is second closest to the stop among all the lenses disposed between the stop and the image side; Rd is a radius of curvature of an image side surface of a lens, and the lens is third closest to the image plane among all the lenses disposed between the stop and the image side; TTL is an interval from an object side surface of the first lens to the image plane along the optical axis; BFL is an interval from an image side surface of the eighth lens to the image plane along the optical axis; f1 is an effective focal length of the first lens; f is an effective focal length of the wide-angle lens assembly; Vd4 is an Abbe number of the fourth lens; and Vd5 is an Abbe number of the fifth lens.

7. The wide-angle lens assembly as claimed in claim 4, wherein the second lens further comprises a convex surface facing the image side.

8. The wide-angle lens assembly as claimed in claim 7, further comprising a stop disposed between the second lens and the third lens;
wherein the wide-angle lens assembly satisfies at least one of following conditions:

−4.8 mm<(Ra+Rc)/Vdb<2.1 mm;

−4<Rb/Rc<170;

−75.22 mm<Rd+Rc<−30.41 mm;

−37 mm≤fb+Rc<7 mm;

−20<Ra/fc<37;

5.2<TTL/BFL<5.8;

−1.3<f1/f<−1.1;

2.9<Vd4/Vd5<3.7;

wherein Ra is a radius of curvature of an image side surface of a lens, and the lens is closest to the stop among all the lenses disposed between the object side and the stop; Rc is a radius of curvature of an object side surface of a lens, fc is an effective focal length of the lens, and the lens is closest to an image plane among all the lenses disposed between the stop and the image side; Vdb is an Abbe number of a lens, Rb is a radius of curvature of an object side surface of the lens, fb is an effective focal length of the lens, and the lens is second closest to the stop among all the lenses disposed between the stop and the image side; Rd is a radius of curvature of an image side surface of a lens, and the lens is third closest to the image plane among all the lenses disposed between the stop and the image side; TTL is an interval from an object side surface of the first lens to the image plane along the optical axis; BFL is an interval from an image side surface of the eighth lens to the image plane along the optical axis; f1 is an effective focal length of the first lens; f is an effective focal length of the wide-angle lens assembly; Vd4 is an Abbe number of the fourth lens; and Vd5 is an Abbe number of the fifth lens.

9. The wide-angle lens assembly as claimed in claim 3, wherein the fourth lens further comprises a convex surface facing the object side.

10. The wide-angle lens assembly as claimed in claim 9, further comprising a stop disposed between the second lens and the third lens;
wherein the wide-angle lens assembly satisfies at least one of following conditions:

$-4.8$ mm$<(Ra+Rc)/Vdb<2.1$ mm;

$-4<Rb/Rc<170$;

$-75.22$ mm$<Rd+Rc<-30.41$ mm;

$-37$ mm$<fb+Rc<7$ mm;

$-20<Ra/fc<37$;

$5.2<TTL/BFL<5.8$;

$-1.3<f1/f<-1.1$;

$2.9<Vd4/Vd5<3.7$;

wherein Ra is a radius of curvature of an image side surface of a lens, and the lens is closest to the stop among all the lenses disposed between the object side and the stop; Rc is a radius of curvature of an object side surface of a lens, fc is an effective focal length of the lens, and the lens is closest to an image plane among all the lenses disposed between the stop and the image side; Vdb is an Abbe number of a lens, Rb is a radius of curvature of an object side surface of the lens, fb is an effective focal length of the lens, and the lens is second closest to the stop among all the lenses disposed between the stop and the image side; Rd is a radius of curvature of an image side surface of a lens, and the lens is third closest to the image plane among all the lenses disposed between the stop and the image side; TTL is an interval from an object side surface of the first lens to the image plane along the optical axis; BFL is an interval from an image side surface of the eighth lens to the image plane along the optical axis; f1 is an effective focal length of the first lens; f is an effective focal length of the wide-angle lens assembly; Vd4 is an Abbe number of the fourth lens; and Vd5 is an Abbe number of the fifth lens.

11. The wide-angle lens assembly as claimed in claim 3, wherein:
the first lens is a biconcave lens and further comprises a concave surface facing the image side; and
the third lens is a biconvex lens with positive refractive power and comprises a convex surface facing the object side and a convex surface facing the image side.

12. The wide-angle lens assembly as claimed in claim 3, wherein the third, fourth, fifth, sixth, seventh, and eighth lenses comprise two surfaces, respectively, at least one of the surfaces is an aspheric surface.

13. The wide-angle lens assembly as claimed in claim 3, further comprising a stop disposed between the second lens and the third lens.

14. The wide-angle lens assembly as claimed in claim 3, further comprising a stop disposed between the second lens and the third lens;
wherein the wide-angle lens assembly satisfies at least one of following conditions:

$-4.8$ mm$<(Ra+Rc)/Vdb<2.1$ mm;

$-4<Rb/Rc<170$;

$-75.22$ mm$<Rd+Rc<-30.41$ mm;

$-37$ mm$<fb+Rc<7$ mm;

$-20<Ra/fc<37$;

$5.2<TTL/BFL<5.8$;

$-1.3<f1/f<-1.1$;

$2.9<Vd4/Vd5<3.7$;

wherein Ra is a radius of curvature of an image side surface of a lens, and the lens is closest to the stop among all the lenses disposed between the object side and the stop; Rc is a radius of curvature of an object side surface of a lens, fc is an effective focal length of the lens, and the lens is closest to an image plane among all the lenses disposed between the stop and the image side; Vdb is an Abbe number of a lens, Rb is a radius of curvature of an object side surface of the lens, fb is an effective focal length of the lens, and the lens is second closest to the stop among all the lenses disposed between the stop and the image side; Rd is a radius of curvature of an image side surface of a lens, and the lens is third closest to the image plane among all the lenses disposed between the stop and the image side; TTL is an interval from an object side surface of the first lens to the image plane along the optical axis; BFL is an interval from an image side surface of the eighth lens to the image plane along the optical axis; f1 is an effective focal length of the first lens; f is an effective focal length of the wide-angle lens assembly; Vd4 is an Abbe number of the fourth lens; and Vd5 is an Abbe number of the fifth lens.

15. A wide-angle lens assembly comprising:
a first lens which is with negative refractive power and comprises a concave surface facing an object side;
a second lens which is with positive refractive power;
a third lens which is with refractive power;
a fourth lens which is with refractive power and comprises a convex surface facing an image side;
a fifth lens which is a biconcave lens with negative refractive power and comprises a concave surface facing the object side and a concave surface facing the image side;
a sixth lens which is a biconvex lens with positive refractive power and comprises a convex surface facing the object side and a convex surface facing the image side;
a seventh lens which is with positive refractive power; and
an eighth lens which is with negative refractive power and comprises a concave surface facing the object side;
wherein the first lens, the second lens, the third lens, the fourth lens, the fifth lens, the sixth lens, the seventh lens, and the eighth lens are arranged in order from the object side to the image side along an optical axis.

\* \* \* \* \*